United States Patent [19]
Ozaki et al.

[11] Patent Number: 5,572,507
[45] Date of Patent: Nov. 5, 1996

[54] OPTICAL DISC, DEVICE FOR CHECKING OPTICAL DISC, AND DEVICE FOR RECORDING INFORMATION ON OPTICAL DISC

[75] Inventors: Kazuhisa Ozaki, Yokosuka; Kanji Kayanuma, Hadano; Hirofumi Nagano, Yokohama, all of Japan

[73] Assignee: Victor Company of Japan, Ltd., Yokohama, Japan

[21] Appl. No.: 526,190

[22] Filed: Sep. 11, 1995

[30] Foreign Application Priority Data

Sep. 22, 1994 [JP] Japan .................... 6-254804

[51] Int. Cl.$^6$ ...................................... G11B 7/00
[52] U.S. Cl. .................. 369/275.4; 369/58; 369/54; 369/47; 369/44.26
[58] Field of Search ................ 369/58, 54, 47, 369/48, 49, 50, 59, 116, 32, 44.26, 44.34, 275.3, 275.4

[56] References Cited

U.S. PATENT DOCUMENTS

| | | | |
|---|---|---|---|
| 5,043,965 | 8/1991 | Iida et al. | 369/116 X |
| 5,062,091 | 10/1991 | Maeda et al. | 369/54 X |
| 5,321,675 | 6/1994 | Ito et al. | 369/32 |

FOREIGN PATENT DOCUMENTS

| | | |
|---|---|---|
| 0545472A1 | 6/1993 | European Pat. Off. . |
| 0637023 | 2/1995 | European Pat. Off. . |
| 61-123026 | 6/1986 | Japan . |
| 62-78727 | 4/1987 | Japan . |
| 2-87344 | 3/1990 | Japan . |
| 3-181023 | 8/1991 | Japan . |

OTHER PUBLICATIONS

TC9236F (1991), pp. (741–744).
AN8803SB (Dec. 3, 1990).
International Standard, "Information Processing–Volume and File Structure of CD_ROM for Information Interchange." ISO 9660: 1988(E).

Primary Examiner—Georgia Y. Epps
Assistant Examiner—Muhammad N. Edun
Attorney, Agent, or Firm—Lowe, Price, LeBlanc & Becker

[57] ABSTRACT

An optical disc has a sequence of pits which extends along a track. The pit sequence represents a recorded signal divided into data blocks. The pit sequence includes a normal pit train and an unusual pit train. The normal pit train is symmetrical with respect to a center of the track. The unusual pit train is different from the normal pit train in at least one of shape and pit arrangement. The unusual pit train is at a position having a predetermined relation with the data blocks.

7 Claims, 22 Drawing Sheets

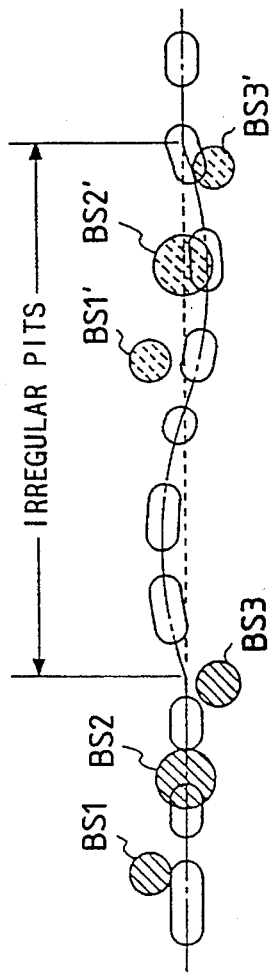
FIG. 1(A)
FIG. 1(B)
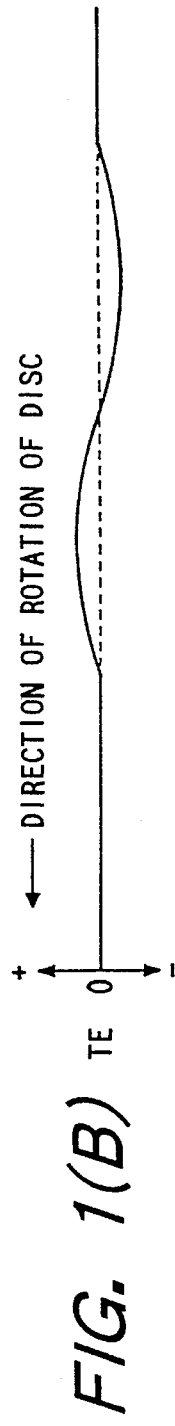
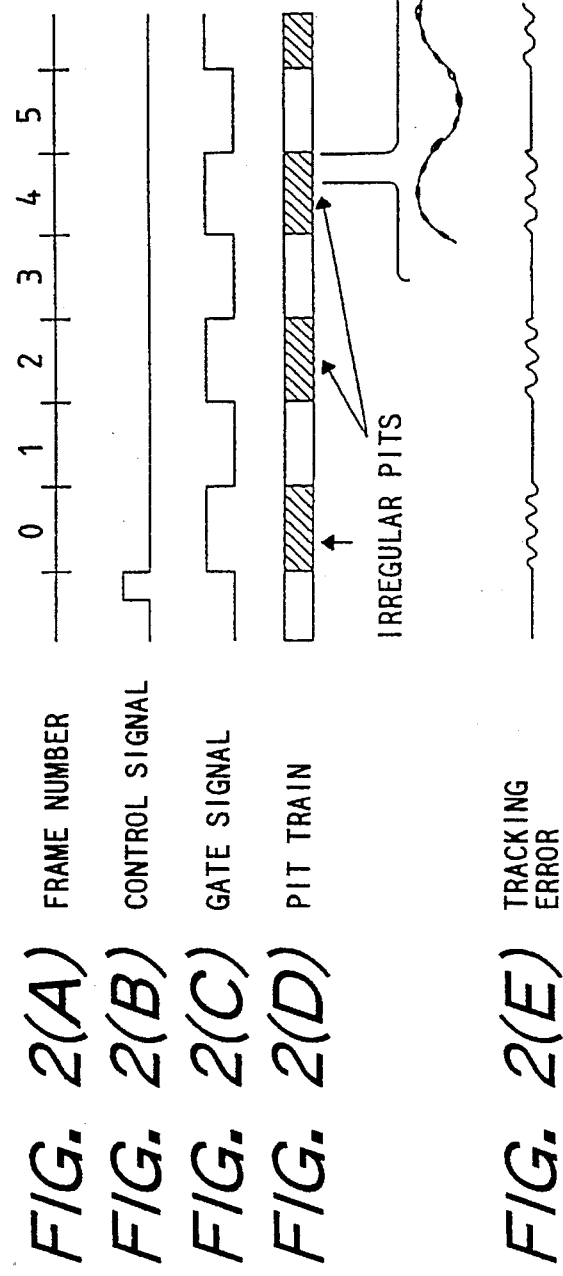
FIG. 2(A) FRAME NUMBER
FIG. 2(B) CONTROL SIGNAL
FIG. 2(C) GATE SIGNAL
FIG. 2(D) PIT TRAIN
FIG. 2(E) TRACKING ERROR

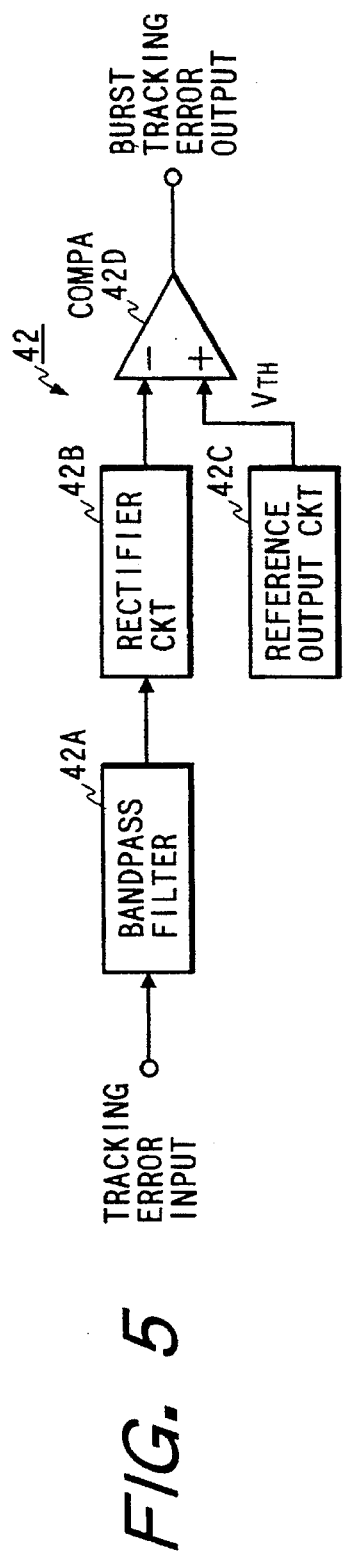
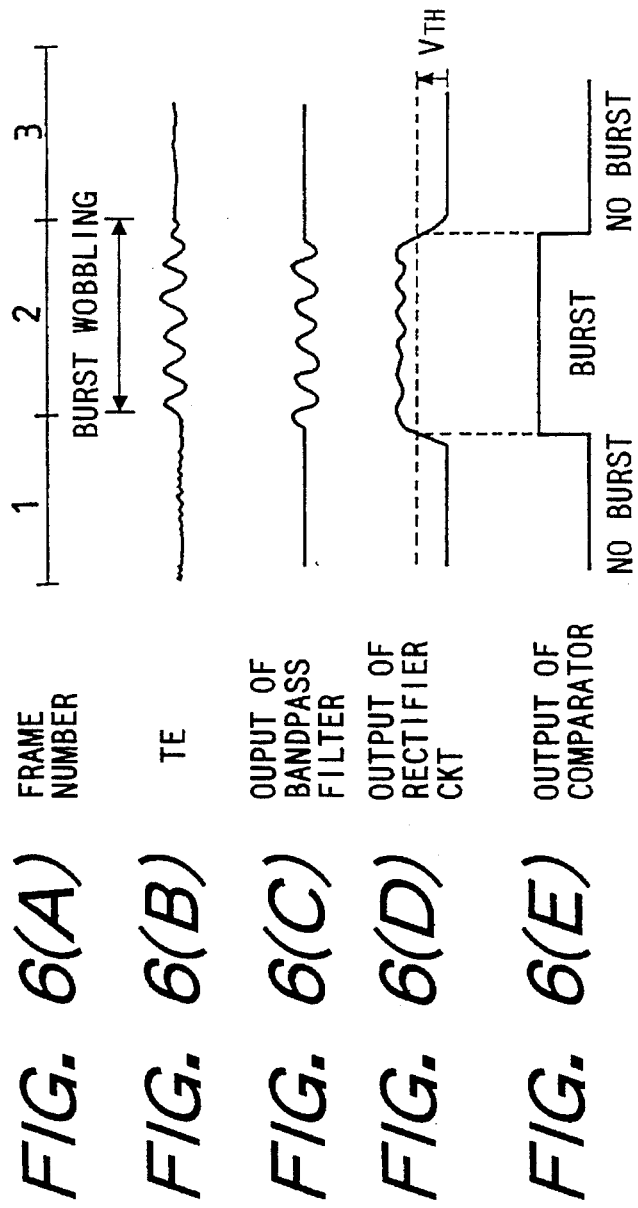
FIG. 5
FIG. 6(A)
FIG. 6(B)
FIG. 6(C)
FIG. 6(D)
FIG. 6(E)

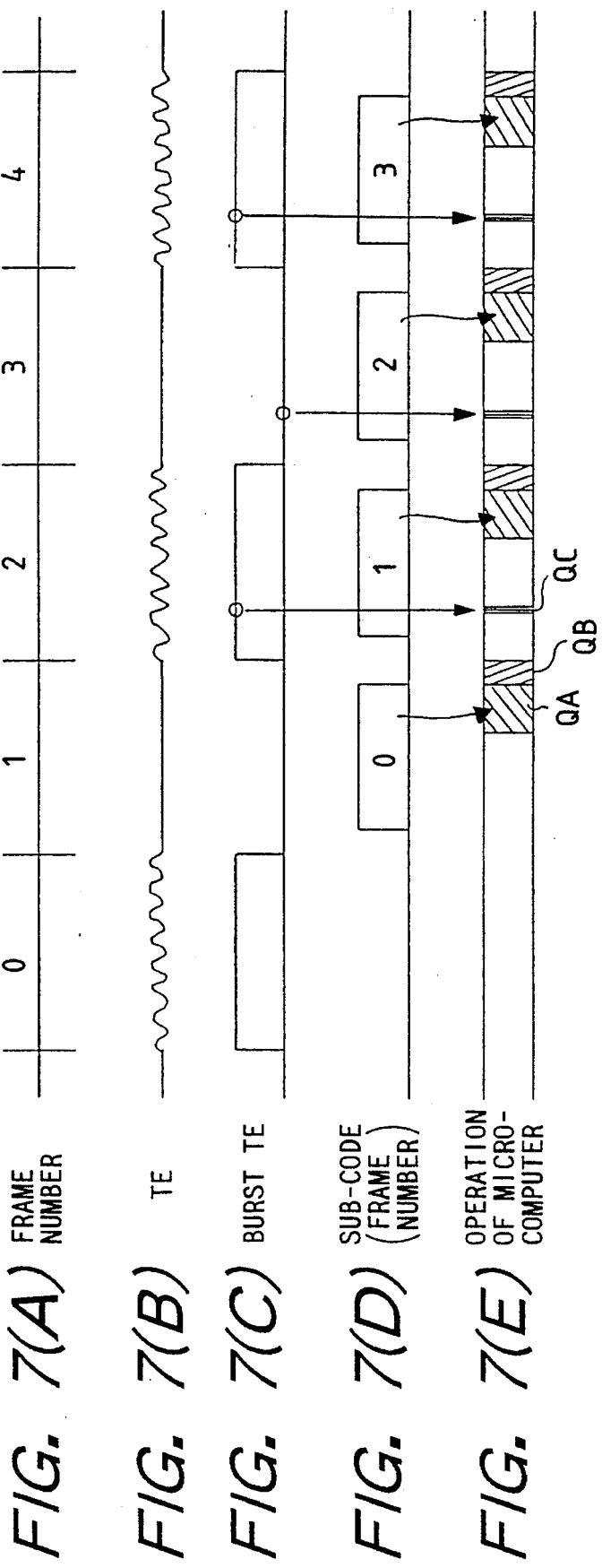

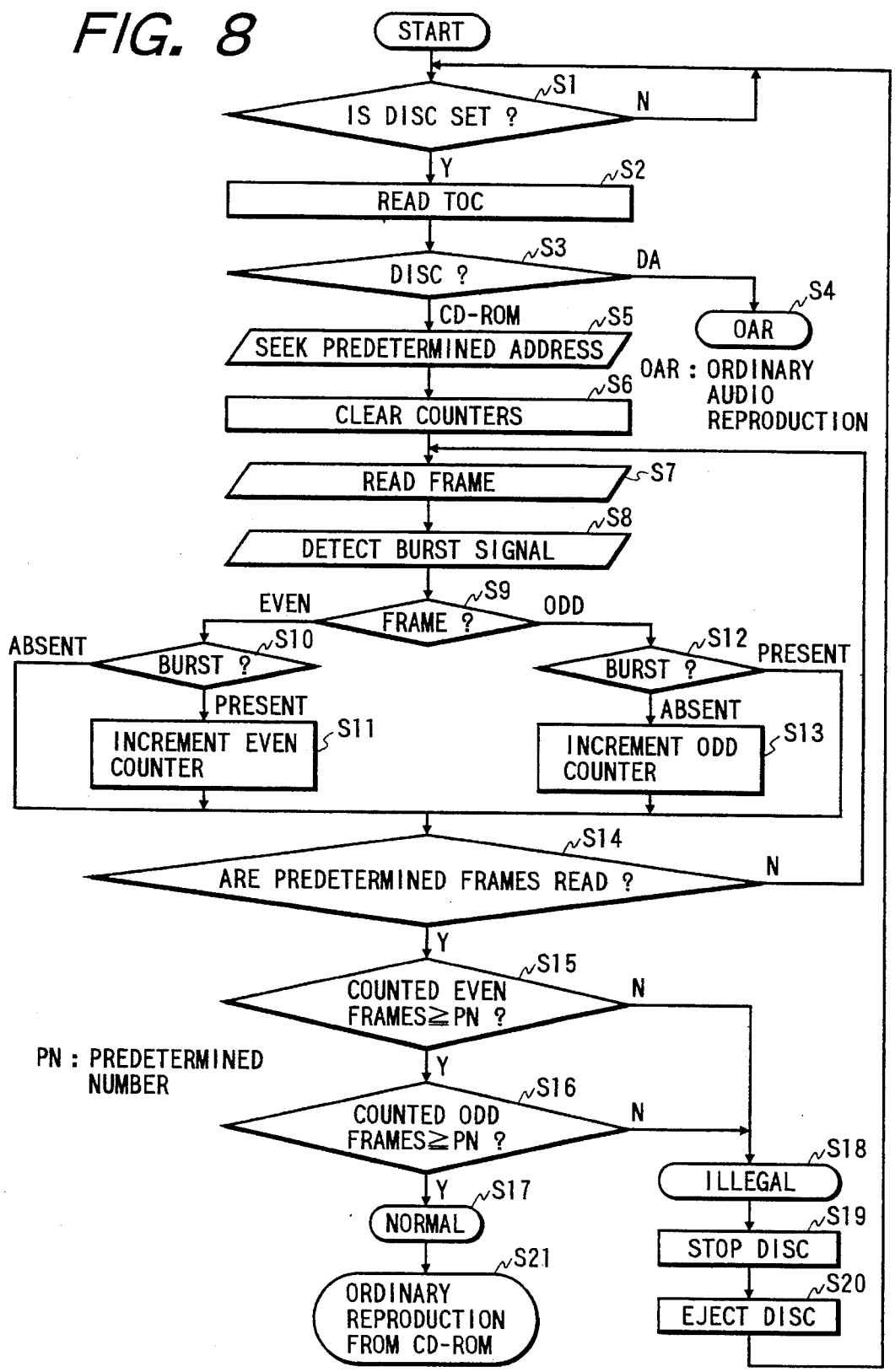

FIG. 10(A)
FIG. 10(B)
FIG. 10(C)
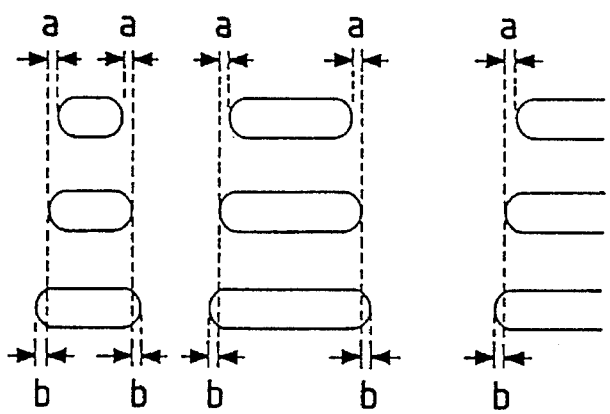
FIG. 11
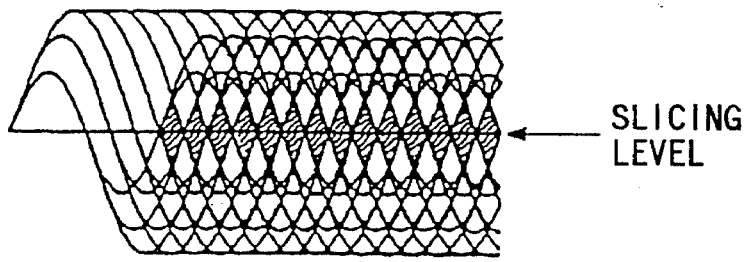
SLICING LEVEL

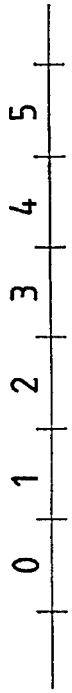
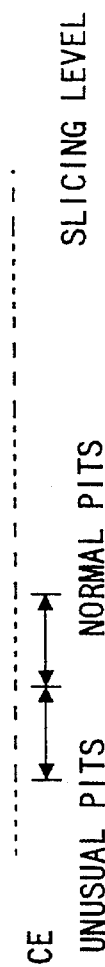
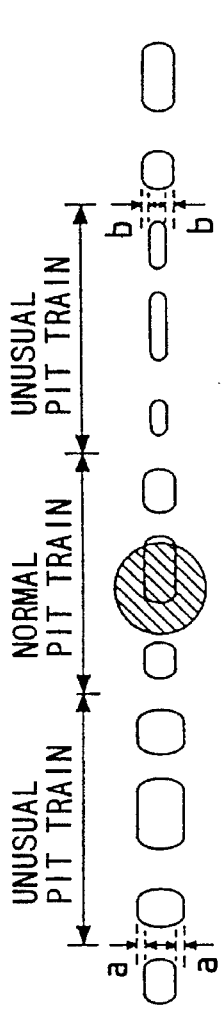
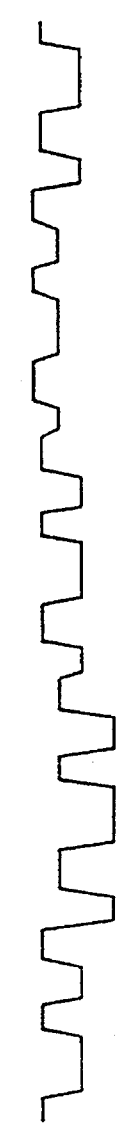
FIG. 17(A) FRAME NUMBER
FIG. 17(B) CONTROL SIGNAL
FIG. 17(C) GATE SIGNAL
FIG. 17(D) PIT SEQUENCE
FIG. 17(E) RF SIGNAL
FIG. 17(F) DETECTION SIGNAL
FIG. 18(A)
FIG. 18(B)

VAL: VARIATION-IN-AMOUNT-OF-LIGHT

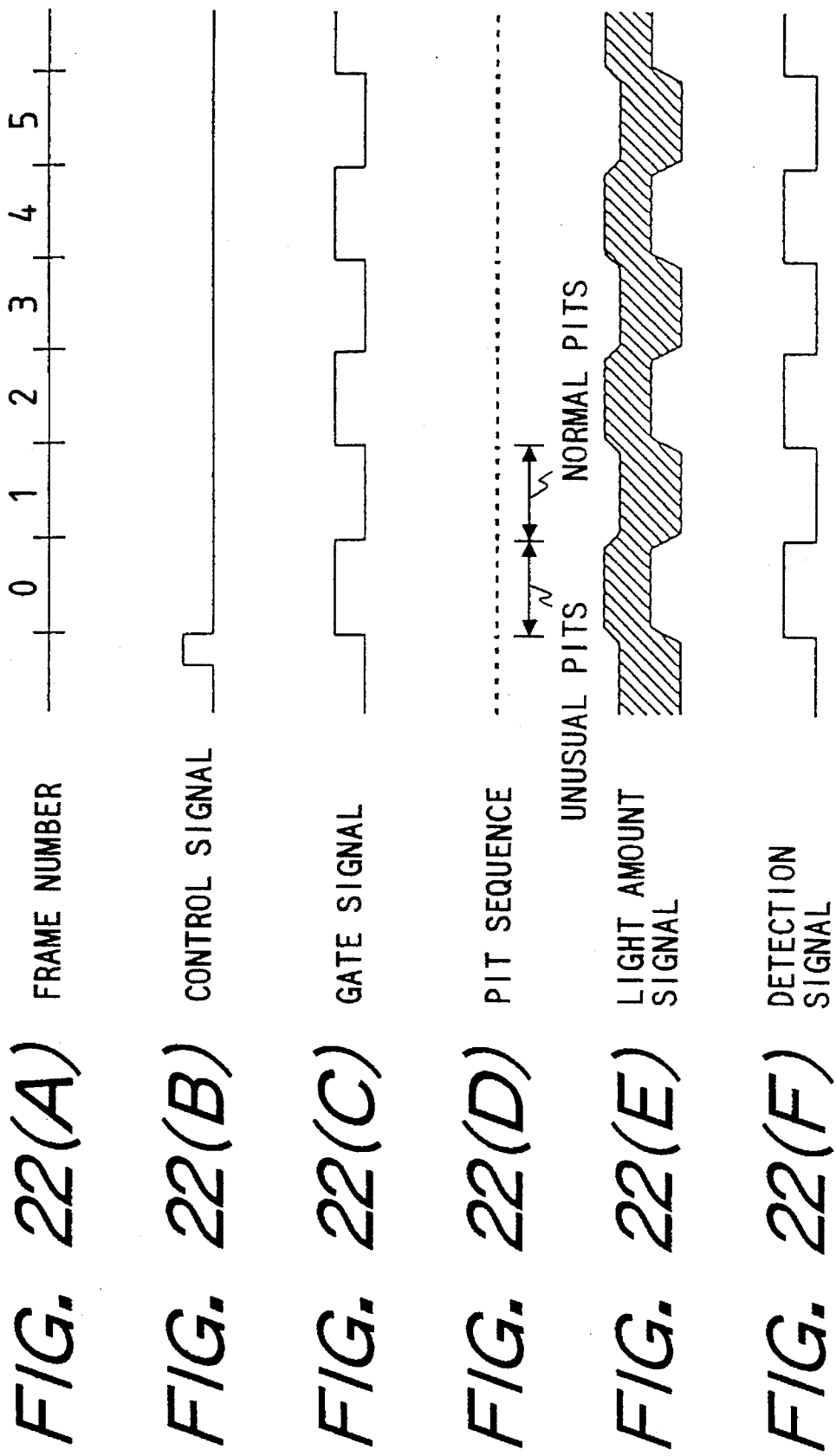

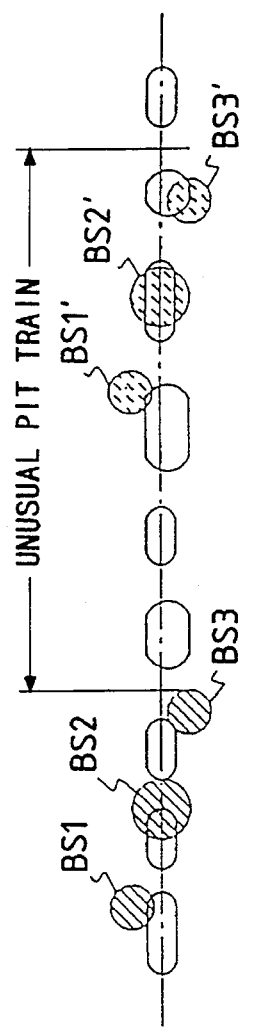
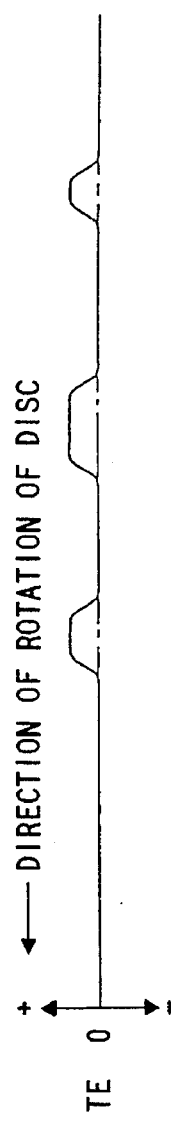
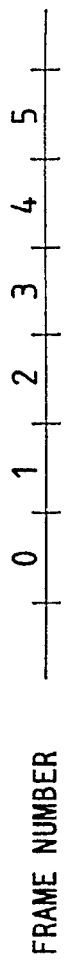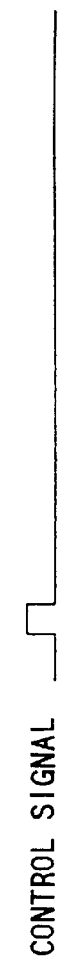
FIG. 23(A)
FIG. 23(B)
FIG. 24(A)
FIG. 24(B)
FIG. 24(C)
FIG. 24(D)
FIG. 24(E)
FIG. 24(F)

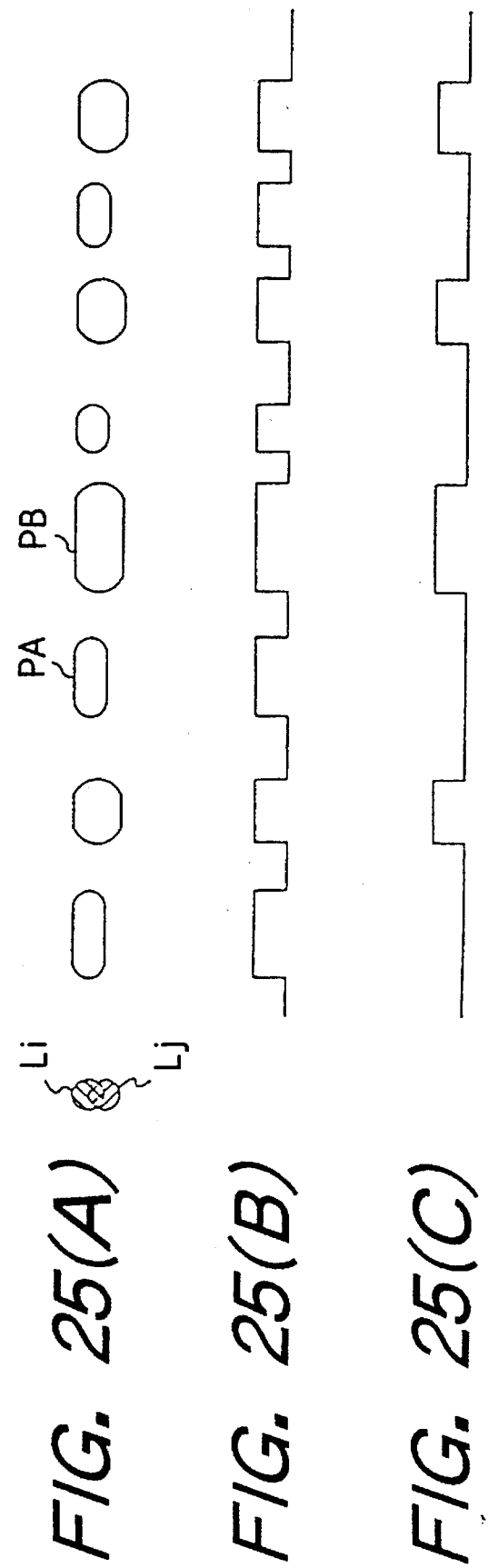

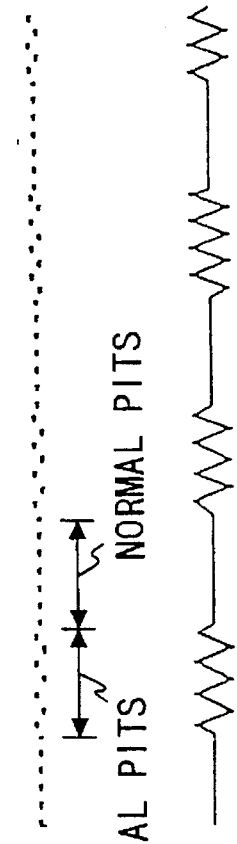
FIG. 28(A) FRAME NUMBER
FIG. 28(B) CONTROL SIGNAL
FIG. 28(C) GATE SIGNAL
FIG. 28(D) PIT SEQUENCE
FIG. 28(E) TE
FIG. 28(F) DETECTION SIGNAL

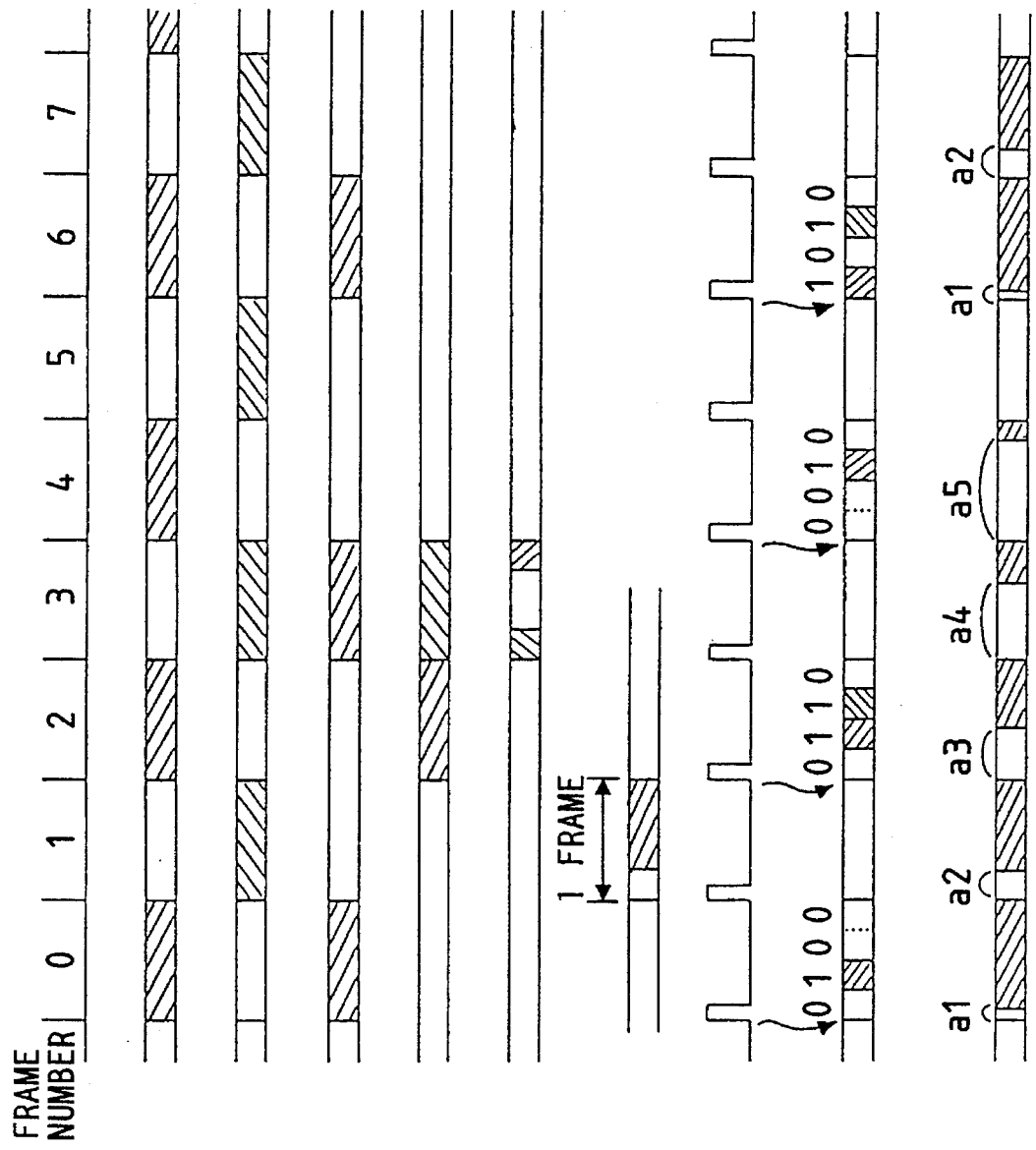

OPTICAL DISC, DEVICE FOR CHECKING OPTICAL DISC, AND DEVICE FOR RECORDING INFORMATION ON OPTICAL DISC

BACKGROUND OF THE INVENTION

1. Field of the Invention

This invention relates to an optical disc such as a CD-ROM (a Compact Disc read-only memory) which is designed to prevent illegally copying of information (for example, information of a television game or a computer game) recorded thereon. Further, this invention relates to a device for checking an optical disc to determine whether or not the optical disc contains illegal copy information. Moreover, this invention relates to a device for recording information on such an optical disc.

2. Description of the Prior Art

A CD-ROM or the like is manufactured according to the published standards such as ISO 9660 standards established by International Standard Organization. To prevent illegally copying of information from a legitimate optical disc in conformity with the standards, a copy protection code is preliminarily recorded on the optical disc. Thus, an optical disc containing such a copy protection code is judged to be legitimate. On the other hand, an optical disc lacking a copy protection code is judged to be illegal.

The effect of such a copy protection method is limited for the following reason. When all information on a legitimate optical disc is copied and transferred to another optical disc (a second optical disc), the second optical disc can also be used as a legitimate optical disc.

A Mini-Disc (MD) uses another copy protection technique called a serial copy management system (SCMS). The SCMS employs a copy protection code related to the permissibility of copying data. To prevent data recorded on an MD from being digitally copied twice or more, the SCMS refers to the copy protection code. Specifically, the copy protection code is preliminary written in a TOC (total-of-contents) area of the MD.

According to the SCMS, if the copy protection code in a first MD indicates the absence of a requirement for protection, copying data or information from the first MD to a second MD is permitted. During the copying process, the copy protection code indicating the presence of a requirement for protection is written into a TOC area of the second MD. On the other hand, if the copy protection code in a first MD indicates the presence of a requirement for protection, copying data or information from the first MD to a second MD is inhibited.

The effect of the copy protection method based on the SCMS is limited for the following reason. When all information on a legitimate MD is copied and transferred to another MD (a second MD), the second MD can also be used as a legitimate MD.

SUMMARY OF THE INVENTION

It is a first object of this invention to provide an improved optical disc.

It is a second object of this invention to provide an improved device for checking an optical disc to determine whether or not the optical disc contains illegal copy information.

It is a third object of this invention to provide an improved device for recording information on an optical disc.

A first aspect of this invention provides an optical disc having a sequence of pits which extends along a track, the pit sequence representing a recorded signal divided into data blocks, the pit sequence including a normal pit train and an unusual pit train, the normal pit train being symmetrical with respect to a center of the track, the unusual pit train being different from the normal pit train in at least one of shape and pit arrangement, the unusual pit train being at a position having a predetermined relation with the data blocks.

A second aspect of this invention is based on the first aspect thereof and provides an optical disc wherein the unusual pit train represents a wobbling signal superimposed on a tracking error signal.

A third aspect of this invention is based on the first aspect thereof, and provides an optical disc wherein the unusual pit train causes a variation in symmetry of an RF signal.

A fourth aspect of this invention is based on the first aspect thereof, and provides am optical disc wherein the unusual pit train causes a variation in a signal representing a light amount.

A fifth aspect of this invention is based on the second aspect thereof, and provides an optical disc wherein the wobbling signal represented by the unusual pit train is of a burst shape.

A sixth aspect of this invention provides an optical disc having a sequence of pits which extends along a track, the pit sequence representing a recorded signal divided into data blocks, the pit sequence including normal pit trains and unusual pit trains, the normal pit trains being symmetrical with respect to a center of the track, the unusual pit trains being different from the normal pit trains in at least one of shape and pit arrangement, the unusual pit trains being at positions having a predetermined relation with the data blocks, the unusual pit trains being spaced at intervals.

A seventh aspect of this invention provides a device for checking an optical disc which comprises first means for reproducing a signal from the optical disc; second means connected to the first means for detecting whether or not an unusual pit train is present in the optical disc by referring to the signal reproduced by the first means, the unusual pit train being different from a normal pit train in at least one of shape and pit arrangement, the normal pit train being symmetrical with respect to a track center; ad third means connected to the second means for judging whether the optical disc is legitimate or illegal in response to a result of the detecting by the second means.

An eighth aspect of this invention provides a device for recording information on an optical disc which comprises first means for emitting a first laser light beam; second means for generating a gate signal synchronized with data block units of an information signal; third means connected to the first means and the second means for converting a first laser light beam into a second laser light beam in response to the information signal and the gate signal; and fourth means connected to the third means for providing a sequence of pits in the optical disc in response to the second laser light beam; wherein the third means comprises means for modulating an intensity of the first laser light beam in response to the information signal, and means for changing the first laser light beam in response to the gate signal to cause the fourth means to provide an unusual pit train in the optical disc, the unusual bit train being different from a normal pit train in at least one of shape and pit arrangement, the normal pit train being symmetrical with respect to a track center.

BRIEF DESCRIPTION OF THE DRAWINGS

FIG. 1(A) is a diagram of a sequence of pits in an optical disc according to a first embodiment of this invention.

FIG. 1(B) is a time-domain diagram of a tracking error signal which is generated during the scanning of the pit sequence in FIG. 1(A).

FIG. 2(A) is a time-domain diagram of a frame number.

FIG. 2(B) is a time-domain diagram of a control signal generated in a recording device in the first embodiment.

FIG. 2(C) is a time-domain diagram of a gate signal generated in the recording device in the first embodiment.

FIG. 2(D) is a time-domain diagram of a train of pits in the first embodiment.

FIG. 2(E) is a time-domain diagram of a tracking error signal which is generated during the scanning of the pit train in FIG. 2(D).

FIG. 5 is a block diagram of a burst tracking error detection circuit in FIG. 4.

FIGS. 6(A), 6(B), 6(C), 6(D), and 6(E) are time-domain diagrams of a frame number and signals in the burst tracking error detection circuit of FIG. 5.

FIG. 7(A) is a time-domain diagram of a frame number.

FIG. 7(B) is a time-domain diagram of a tracking error signal in connection with the frame number in FIG. 7(A).

FIG. 7(C) is a time-domain diagram of a burst tracking error signal generated by the burst tracking error detection circuit in FIGS. 4 and 5.

FIG. 7(D) is a time-domain diagram of a frame number recognized by a microcomputer in FIG. 4.

FIG. 7(E) is a diagram of timings of the start of given processes in the microcomputer in FIG. 4.

FIG. 8 is a flowchart of a segment of a program for controlling the microcomputer in FIG. 4.

FIGS. 10(A), 10(B), and 10(C) are diagrams of trains of pits in an optical disc according to a second embodiment of this invention.

FIG. 11 is a diagram of the waveform of a RF signal which is generated during the reproduction of information from the normal 50%-duty pit train of FIG. 10(B).

FIG. 17(A) is a time-domain diagram of a frame number.

FIG. 17(B) is a time-domain diagram of a control signal generated in the recording device of FIG. 16.

FIG. 17(C) is a time-domain diagram of a gate signal generated in the recording device of FIG. 16.

FIG. 17(D) is a diagram of a sequence of pits in the second embodiment.

FIG. 17(E) is a time-domain diagram of an RF signal which is generated during the scanning of the pit sequence in FIG. 17(D).

FIG. 17(F) is a time-domain diagram of a detection signal generated in the reproduction device of FIG. 13 in response to the RF signal of FIG. 17(E).

FIG. 18(A) is a diagram of a sequence of pits in an optical disc according to a third embodiment of this invention.

FIG. 18(B) is a time-domain diagram of a signal reproduced from the pit sequence of FIG. 18(A).

FIG. 22(A) is a time-domain diagram of a frame number.

FIG. 22(B) is a time-domain diagram of a control signal generated in the recording device of FIG. 21.

FIG. 22(C) is a time-domain diagram of a gate signal generated in the recording device of FIG. 21.

FIG. 22(D) is a diagram of a sequence of pits in the third embodiment.

FIG. 22(E) is a time-domain diagram of an RF signal which is generated during the scanning of the pit sequence in FIG. 22(D).

FIG. 22(F) is a time-domain diagram of a detection signal generated in the reproduction device of FIG. 19 in response to the RF signal of FIG. 22(E).

FIG. 23(A) is a diagram of a sequence of pits in an optical disc according to a fourth embodiment of this invention.

FIG. 23(B) is a time-domain diagram of a tracking error signal which is generated during the scanning of the pit sequence in FIG. 23(A).

FIG. 24(A) is a time-domain diagram of a frame number.

FIG. 24(B) is a time-domain diagram of a control signal generated in the fourth embodiment.

FIG. 24(C) is a time-domain diagram of a gate signal generated in the fourth embodiment.

FIG. 24(D) is a diagram of a sequence of pits in the fourth embodiment.

FIG. 24(E) is a time-domain diagram of a tracking error signal which is generated during the scanning of the pit sequence in FIG. 24(D).

FIG. 24(F) is a time-domain diagram of a detection signal generated in response to the tracking error signal of FIG. 24(E).

FIG. 25(A) is a diagram of a sequence of pits in the fourth embodiment.

FIG. 25(B) is a time-domain diagram of an EFM signal corresponding to the pit sequence in FIG. 25(A).

FIG. 25(C) is a time-domain diagram of an unusual pit signal generated in response to the EFM signal of FIG. 25(B).

FIG. 28(A) is a time-domain diagram of a frame number.

FIG. 28(B) is a time-domain diagram of a control signal generated in the fifth embodiment.

FIG. 28(C) is a time-domain diagram of a gate signal generated in the fifth embodiment.

FIG. 28(D) is a diagram of a sequence of pits in the fifth embodiment.

FIG. 28(E) is a time-domain diagram of a tracking error signal which is generated during the scanning of the pit sequence in FIG. 28(D).

FIG. 28(F) is a time-domain diagram of a detection signal generated in response to the tracking error signal of FIG. 28(E).

FIG. 30(A) is a time-domain diagram of a frame number.

FIGS. 30(B), 30(C), 30(D), 30(E), 30(F), and 30(G) are time-domain diagrams of the arrangements of irregular pit trains (unusual pit trains) and normal pit trains according to embodiments of this invention.

FIG. 30(H) is a time-domain diagram of a pulse signal synchronized with a frame.

FIGS. 30(I) and 30(J) are time-domain diagrams of the arrangements of irregular pit trains (unusual pit trains) and normal pit trains according to embodiments of this invention.

DESCRIPTION OF THE PREFERRED EMBODIMENTS

First Embodiment

1. Optical Disc

Figure 3:
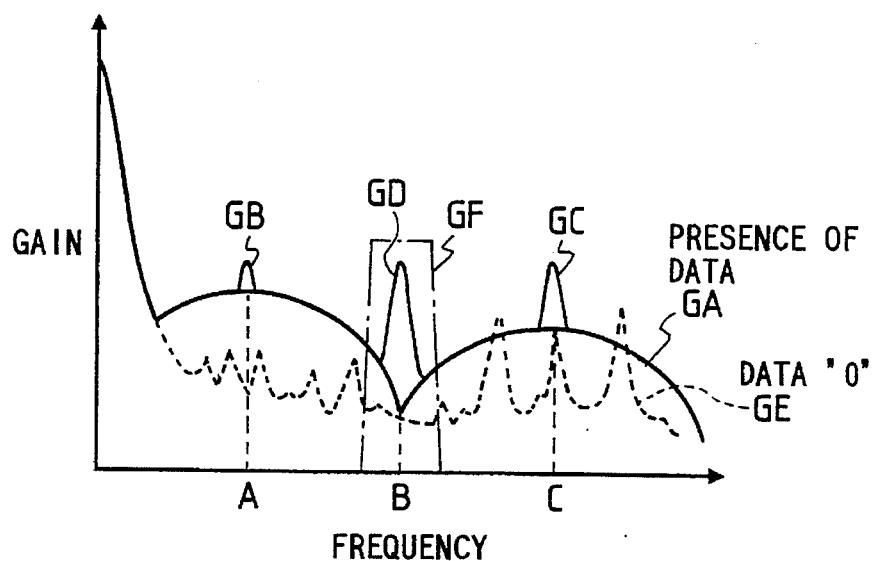
FIG. 3 is a diagram of the frequency spectrums of a tracking error signal and a wobbling signal in the first embodiment.

As shown in FIG. 1(A), an optical disc has a sequence or an arrangement of pits which extends along a track partially exhibiting a radial wobble. In other words, the optical disc has normal pits as well as wobbling pits (irregular pits or unusual pits). The pit arrangement of FIG. 1(A) includes a normal pit train and an irregular pit train (a wobbling pit train or an unusual pit train) at a left-hand side and a right-hand side of the drawing respectively. The normal pit train consists of normal pits. The irregular pit train consists of wobbling pits (irregular pits or unusual pits). When the pit sequence of FIG. I(A) is scanned, a resultant tracking error signal TE has a waveform shown in FIG. 1(B). A pit arrangement in a left-hand region of FIG. 1(A) is similar to an ordinary pit arrangement or a normal pit arrangement in a CD. Namely, the central line of the arrangement of the pits of the left-hand region in FIG. 1(A) is coincident with the central line of a related track. On the other hand, the central line of the arrangement of irregular pits (wobbling pits) in a right-hand region of FIG. 1 (A) deviates from a virtual central line of a related track. Specifically, the centers of the irregular pits (the wobbling pits) wobble with respect to the virtual central line of the track.

An optical pickup head applies three light beam spots to the optical disc. The three light beam spots include a main beam spot BS2 and side beam spots BS1 and BS3 (see FIG. 1(A)). The side beam spots. BS1 and BS3 are radially offset from the main beam spot BS2 in opposite directions respectively. The tracking error signal TE is generated on the basis of the difference between the amounts of reflected light which relate to the side beam spots BS1 and BS3 respectively.

During the scanning of ordinarily arranged pits (see the left-hand region of FIG. 1(A)) by the three beam spots BS1, BS2, and BS3, the amounts of reflected light related to the side beam spots BS1 and BS3 are substantially equal to each other. Therefore, in this case, the level of the resultant tracking error signal TE is substantially null (that is, "0").

During the scanning of wobbling pits (see the right-hand region of FIG. 1(A)) by the three beam spots BS1', BS2', and BS3', the amounts of reflected light related to the side beam spots BS1' and BS3' are different from each other. Therefore, in this case, the level of the resultant tracking error signal TE varies from the null level in accordance with a change in the radial distance from the virtual central line of the track to each of the pits. Therefore, during the scanning of wobbling pits, a wobbling signal is superimposed upon the resultant tracking error signal TE. In other words, during the scanning of wobbling pits, the resultant tracking error signal TE has wobbling components depending on the configuration of the wobbling pits. It should be noted that the radial distance from the virtual central line of the track to each of the pits is also referred to as the deviation amount.

As understood from the previous description, the formation of wobbling pits on an optical disc causes the recording of a wobbling signal on the optical disc. Such a wobbling signal is periodically and intermittently recorded on a predetermined track or tracks on a legitimate optical disc in data-block units. During the reproduction of information from such a track region of an optical disc, if a wobbling signal is generated in synchronism with every data block, the optical disc can be judged to be legitimate. If not, the optical disc can be judged to be illegal.

In view of the prevention of a seeking error and a data error, the deviation amount (that is, the radial distance between the wobbling pit and the virtual central line of the track) is preferably equal to or smaller than about 2% of a track pitch. Furthermore, the deviation amount (that is, the radial distance between the wobbling pit and the virtual central line of the track) is preferably equal to or smaller than about 5% of the pit width in the radial direction.

FIG. 2(D) shows an example of the train of optical-disc pits including normal pits and irregular pits (wobbling pits or unusual pits). On an optical disc, there are groups each having successive irregular pits and each forming a wobbling track segment. As shown in FIG. 2(D), the irregular pit groups are intermittently arranged in a burst manner. The arrangement of the irregular pit groups is in logic units of a related track. For example, the arrangement of the irregular pit groups has a given relation with frames of the track (see FIG. 2(A)). Specifically, the irregular pit groups are in even-numbered frames respectively while normal pits occupy odd-numbered frames. During the reproduction of information from the optical disc, a resultant tracking error signal TE has a waveform of FIG. 2(E). As shown in FIG. 2(E), a wobbling signal is periodically caused in the tracking error signal TE by each of the irregular pit groups (see FIG. 2(D)).

The frequency of a wobbling signal caused by irregular pits (wobbling pits or unusual pits) will be described hereinbelow by referring to FIG. 3. When data is reproduced from an ordinary optical disc by an optical pickup head using three light beams, the spectrum of a resultant tracking error signal TE has record signal components denoted by a solid curve GA in FIG. 3. The level of the record signal components increase or decrease at a period determined by the distance between side beam spots BS1 and BS3 (see FIG. 1(A)). The record signal components are noises with respect to a wobbling signal. Thus, at points A and C in FIG. 3 where the level of the record signal components peaks, it is difficult to attain a good C/N (a good carrier-to-noise ratio) for a wobbling signal as indicated by curves GB and GC in FIG. 3. On the other hand, at a point B in FIG. 3 where the level of the record signal components dips, it is possible to attain a good C/N for a wobbling signal as indicated by a curve GD in FIG. 3. The frequency of the wobbling signal is preferably chosen to correspond to a point (for example, the point B in FIG. 3) at which the level of the record signal components dips.

In optical disc portions having data of "0" (for instance, read-in and read-out zones), the level of record signal components is relatively low as denoted by a dotted curve GE in FIG. 3. Accordingly, in such portions, it is possible to attain a good C/N for a wobbling signal. Thus, it is preferable that an optical disc portion having data of "0" (for instance, the read-in zone or the read-out zone) is formed with irregular pits causing wobbling signals.

2. Reproduction Device

Figure 4:
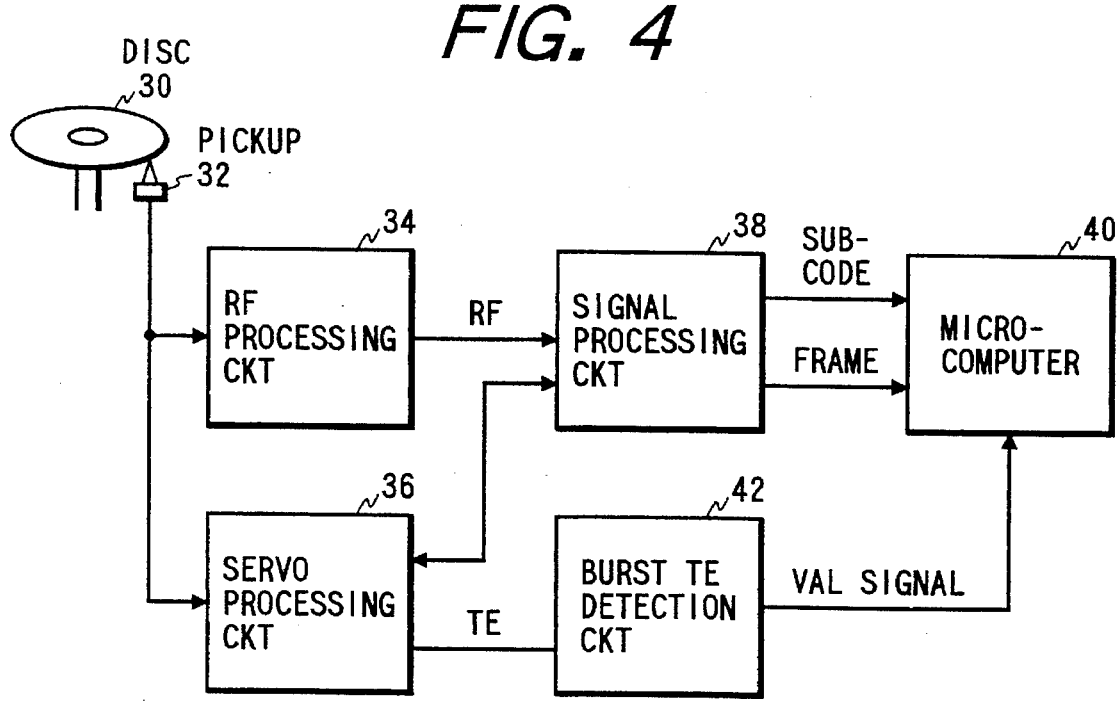
FIG. 4 is a block diagram of a reproduction device in the first embodiment.

With reference to FIG. 4, a device for reproducing information from an optical disc 30 includes an optical pickup head 32 which is followed by an RF processing circuit 34 and a servo processing circuit 36. The RF processing circuit 34 is followed by a signal processing circuit 38. The signal processing circuit 38 is connected to a microcomputer 40. The servo processing circuit 36 is followed by a burst tracking error detection circuit 42. The servo processing circuit 36 is connected to the signal processing circuit 38. The burst tracking error detection circuit 42 is connected to the microcomputer 40.

A signal read out from the optical disc 30 by the optical pickup head 32 is fed to the RF processing circuit 34 and the servo processing circuit 36. The RF processing circuit 34 derives an RF signal from the output signal of the optical disc 30, and feeds the RF signal to the signal processing circuit 38. The signal processing circuit 38 generates sub-code information and frame information from the RF signal, and outputs the sub-code information and the frame information to the microcomputer 40.

The servo processing circuit 36 has a tracking error signal detector by which a deviation or an error in tracking is detected from the output signal of the optical pickup head 32 as a tracking error signal TE. The servo processing circuit 36 outputs the tracking error signal TE to the burst tracking error detection circuit 42. The burst tracking error detection circuit 42 extracts a burst signal from the tracking error signal TE, and generates a digital signal representing the extracted burst signal. The burst tracking error detection circuit 42 outputs the burst-representing digital signal to the microcomputer 40.

As shown in FIG. 5, the burst tracking error detection circuit 42 includes a band pass filter 42A, a rectifier circuit 42B, a reference output circuit 42C, and a comparator 42D. The band pass filter 42A receives the tracking error signal TE from the servo processing circuit 36 (see FIG. 4). The band pass filter 42A is followed by the rectifier circuit 42B. The output terminal of the rectifier circuit 42B is connected to a first input terminal of the comparator 42D. The output terminal of the reference output circuit 42C is connected to a second input terminal of the comparator 42D. The comparator 42D outputs the burst-representing digital signal to the microcomputer 40 (see FIG. 4).

The band pass filter 42A is tuned to the frequency of a wobbling signal. Specifically, the pass band characteristics of the filter 42A are designed in a trapezoid as shown by doted lines GF in FIG. 3. The central frequency of the pass band of the filter 42A agrees with the frequency point B in FIG. 3. The pass band of the filter 42A may be of an inverted notch configuration.

As shown in FIGS. 6(A) and 6(B), the tracking error signal TE outputted from the servo processing circuit 36 has a burst caused by an irregular pit group present in an even-numbered frame. The tracking error signal TE is fed to the burst tracking error detection circuit 42. In the burst tracking error detection circuit 42, the band pass filter 42A selects only wobbling-signal-frequency components of the tracking error signal TE. Accordingly, noise is removed from the tracking error signal TE, and the output signal of the band pass filter 42A has a waveform shown in FIG. 6(C).

The rectifier circuit 42B in the burst tracking error detection circuit 42 rectifies the output signal of the band pass filter 42A, thereby generating and outputting a signal representing the envelope of the output signal of the band pass filter 42A. The output signal of the rectifier 42B has a waveform shown in FIG. 6(D). The comparator 42D receives the output signal of the rectifier circuit 42B. The comparator 42D also receives the output signal of the reference output circuit 42C which represents a predetermined reference voltage VTH (see FIG. 6(D)). The device 42D compares the envelope-representing signal and the reference voltage VTH, thereby converting the envelope-representing signal into a corresponding digital signal. As shown in FIG. 6(E), the digital signal generated by the comparator 42D assumes a logic value of "H" in the presence of a burst, and assumes a logic value of "L" in the absence of a burst. The burst-representing digital signal is outputted from the comparator 42D to the microcomputer 40.

A wobbling signal is recorded in every other frame of the optical disc 30. Specifically, a wobbling signal is recorded in every even-numbered frame but is absent from every odd-numbered frame. Therefore, as shown in FIGS. 7(A) and 7(B), the tracking error signal TE outputted from the serve processing circuit 36 has a burst during a time corresponding to every even-numbered frame. In addition, as shown in FIGS. 7(A) and 7(C), the burst-representing digital signal (the burst tracking error signal) outputted from the burst tracking error detection circuit 42 changes to and remains at a logic value of "H" during a time corresponding to every even-numbered frame.

The microcomputer 40 receives information of the frame number (see FIG. 7(D)) from the signal processing circuit 38. The microcomputer 40 receives the burst-representing digital signal or the burst tracking error signal (see FIG. 7(C)) from the burst tracking error detection circuit 42. The microcomputer 40 samples the information of the frame number at a timing QA in FIG. 7(E), and then recognizes the frame number at a a subsequent timing QB in FIG. 7(E). At a timing QC in FIG. 7(E) which follows the timing QB by a given interval, the microcomputer 40 reads or samples the burst tracking error signal. When the read burst tracking error signal indicates the presence of a wobbling signal and the recognized frame number agrees with an even-numbered frame, the microcomputer 40 executes counting. When the read burst tracking error signal indicates the absence of a wobbling signal and the recognized frame number agrees with an odd-numbered frame, the microcomputer 40 also executes counting. Otherwise, the microcomputer 40 does not execute counting. During intervals different from the periods QA, QB, and QC in FIG. 7(E), the microcomputer 40 executes other processing.

The reproduction device has a disc drive for an optical disc 30. The disc drive is connected to the microcomputer 40 so that the disc drive can be controlled thereby in a known manner.

The microcomputer 40 includes a combination of an input/output port, a CPU, a ROM, and a RAM. The microcomputer 40 operates in accordance with a program stored in the ROM. The program has a segment for checking or determining whether an optical disc 30 is illegal or legitimate. FIG. 8 is a flowchart of this program segment. The program segment of FIG. 8 is started when a power supply (not shown) in the reproduction device is turned on.

With reference to FIG. 8, a first step S1 of the program segment decides whether or not an optical disc 30 is set in the disc drive within the reproduction device according to a known way. When the optical disc 30 is set in the disc drive, the program advances from the step S1 to a step S2. Otherwise, the step S1 is repeated.

The step S2 reads information from a TOC area of the optical disc 30 in a known way. A step S3 following the step S2 decides whether the optical disc 30 is a data storage (a DA such as a CD) or a CD-ROM by referring to the TOC area information. When the optical disc 30 is a data storage, the program advances from the step S3 to a block S4 for executing ordinary audio reproduction. When the optical disc 30 is a CD-ROM, the program advances from the step S3 to a step S5.

The step S5 executes a process of seeking a predetermined track segment (a predetermined address) in which irregular pits or wobbling pits are formed. It should be noted that information of the predetermined track segment is preliminarily stored in the ROM within the microcomputer 40. A step S6 following the step S5 initializes or clears variables corresponding to counters (counter values). After the step S6, the program advances to a step S7.

The step S7 reads the frame information by referring to the output signal of the signal processing circuit 38. A step S8 following the step S7 reads the burst tracking error signal (the burst-representing digital signal) outputted from the burst tracking error detection circuit 42. A step S9 following the step S8 decides whether a current frame is an even-numbered frame or an odd-numbered frame by referring to the frame information. When the current frame is an even-numbered frame, the program advances from the step S9 to a step S10. When the current frame is an odd-numbered frame, the program advances from the step S9 to a step S12.

The step S10 decides whether or not a burst (a wobbling signal) is present by referring to the burst tracking error signal. When a burst is present, the program advances from the step S10 to a step S11. Otherwise, the program jumps from the step S10 to a step S14. The step S11 increments a counter value for even-numbered frames by "1" After the step S11, the program advances to the step S14.

The step S12 decides whether or not a burst (a wobbling signal) is present by referring to the burst tracking error signal. When a burst is absent, the program advances from the step S12 to a step S13. When a burst is present, the program jumps from the step S12 to the step S14. The step S13 increments a counter value for odd-numbered frames by "1". After the step S13, the program advances to the step S14.

The step S14 decides whether or not a predetermined number of frames have been read. When a predetermined number of frames have been read, the program advances from the step S14 to a step S15. Otherwise, the program returns from the step S14 to the step S7.

The step S15 compares the counter value for even-numbered frames with a predetermined number. When the counter value for even-numbered frames is equal to or greater than the predetermined number, the program advances from the step S15 to a step S16. Otherwise, the program advances from the step S15 to a step S18.

The step S16 compares the counter value for odd-numbered frames with the predetermined number. When the counter value for odd-numbered frames is equal to or greater than the predetermined number, the program advances from the step S16 to a step S17. Otherwise, the program advances from the step S16 to the step S18.

The step S17 judges the optical disc 30 to be legitimate. For example, the step S17 sets a given flag to a state indicating that the present optical disc 30 agrees with a legitimate disc. The step S17 is followed by a block S21 for executing ordinary reproduction of information from the CD-ROM.

The step S18 judges the optical disc 30 to be illegal. For example, the step S18 sets the given flag to a state indicating that the present optical disc 30 agrees with an illegal copy disc. The step S18 is followed by a block S19 for stopping the optical disc 30. A step S20 following the step S19 ejects the optical disc 30 from the disc drive. After the step S20, the program returns to the step S1.

A legitimate optical disc has only one zone (one track segment) in which irregular pit groups or wobbling pit groups are periodically and intermittently formed. Alternatively, a legitimate optical disc may have two or more separate zones (two or more separate track segments) in which irregular pit groups or wobbling pit groups are periodically and intermittently formed.

In the case of a legitimate optical disc having plural separate track segments (plural separate zones) in which wobbling pit groups are periodically and intermittently formed, information of a table containing addresses of the wobbling-pit-added track segments may be preliminarily stored in a predetermined area of the disc. In this case, the reproduction device seeks a track on the predetermined area and then reads out the addresses of the wobbling-pit-added track segments from the table. Thereafter, the reproduction device accesses the wobbling-pit-added track segments by referring to the addresses thereof. The reproduction device serves to detect wobbling signals while accessing the wobbling-pit-added track segments.

3. Recording Device

Figure 9:
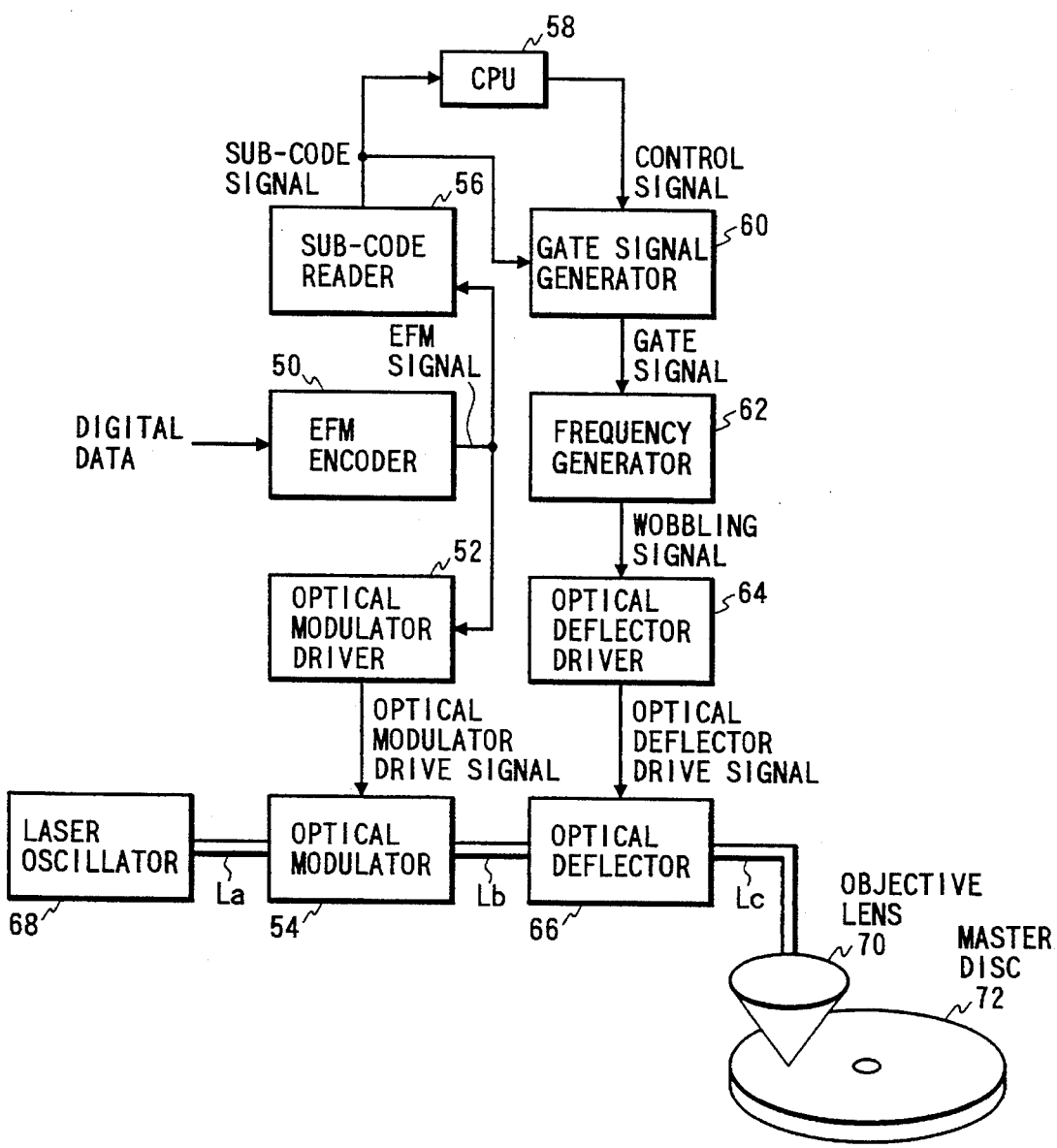
FIG. 9 is a block diagram of a recording device in the first embodiment.

With reference to FIG. 9, a recording device (a mastering machine) includes an EFM encoder 50 which is followed by an optical modulator driver 52 and a sub-code reader 56. The optical modulator driver 52 is electrically connected to an optical modulator 54. The sub-code reader 56 is connected to a CPU 58 and a gate signal generator 60. The CPU 58 is connected to the gate signal generator 60. The gate signal generator 60 is successively followed by a frequency generator 62 and an optical deflector driver 64. The optical deflector driver 64 is electrically connected to an optical deflector 66.

The recording device of FIG. 9 includes a laser oscillator 68 which is successively followed by the optical modulator 54, the optical deflector 66, and an objective lens 70. A master disc 72 is set in a place exposed to a light beam outputted from the objective lens 70.

Digital data representing, for example, software for a television game or a computer game, is inputted into the EFM encoder 50, being encoded thereby into an EFM signal. The EFM encoder 50 outputs the EFM signal to the optical modulator driver 52 and the sub-code reader 56. The optical modulator driver 52 generates a drive signal for the optical modulator 54 in response to the EFM signal. The optical modulator driver 52 outputs the drive signal to the optical modulator 54.

The sub-code reader 56 extracts a sub-code signal from the EFM signal. The sub-code reader 56 outputs the sub-code signal to the CPU 58 and the gate signal generator 60. The CPU 58 continuously monitors address information in the sub-code signal. The CPU 58 outputs a control signal pulse to the gate signal generator 60 when a current address represented by the address information moves into agreement with a predetermined address at which a copy protection code (a wobbling signal) should be recorded. The output signal of the CPU 58 has a waveform such as shown in FIG. 2(B).

The gate signal generator 60 produces a gate signal in response to the sub-code signal and the control signal pulse. The produced gate signal is synchronized with a sub-code frame. The produced gate signal has a waveform such as shown in FIG. 2(C). The gate signal corresponds to a copy protection code. As shown in FIGS. 2(A) and 2(C), the gate signal is of a logic value of "H" during every even-numbered sub-code frame. The gate signal is of a logic value of "L" during every odd-numbered sub-code frame. It should be noted that the gate signal may be of a logic value of "H" and a logic value of "L" during every odd-numbered sub-code frame and every even-numbered sub-code frame respectively. The gate signal generator 60 outputs the gate signal to the frequency generator 62.

The frequency generator 62 outputs a sinusoidal-waveform signal when the gate signal is "H", that is, when the present sub-code frame is even-numbered. The sinusoidal-waveform signal has a predetermined fixed frequency. On the other hand, the frequency generator 62 does not output such a signal when the gate signal is "L", that is, when the present sub-code frame is odd-numbered. Therefore, the output signal of the frequency generator 62 constitutes a burst-shaped wobbling signal synchronized with the sub-code frame. The frequency generator 62 feeds the wobbling signal to the optical deflector driver 64. The optical deflector driver 64 generates a drive signal for the optical deflector 66 in response to the wobbling signal. The optical deflector driver 64 outputs the drive signal to the optical deflector 66.

The laser oscillator 68 continuously applies a laser light beam La to the optical modulator 54. The laser light beam La passes through the optical modulator 54 while being intensity-modulated thereby in response to the drive signal fed from the optical modulator driver 52. Thus, the optical modulator 54 converts the laser light beam La into a second laser light beam (a modulation-resultant laser light beam) Lb. The second laser light beam Lb is propagated from the optical modulator 54 to the optical deflector 66. The second laser light beam Lb passes through the optical deflector 66 while being deflected thereby in response to the drive signal fed from the optical deflector driver 64. Thus, the optical deflector 66 converts the second laser light beam Lb into a third laser light beam (a deflection-resultant laser light beam) Lc.

The third laser light beam Lc is propagated from the optical deflector 66 to the objective lens 70. The third laser light beam Lc passes through the objective lens 70 before being focused thereby into a spot on the master disc 72. The beam spot forms pits in the master disc 72 while the master disc 72 is rotated by a suitable drive device (not shown). The optical deflector 66 causes the position of the beam spot on the master disc 72 to be radially deviated from a virtual central line of a related track in response to the drive signal fed from the optical deflector driver 64. Since the drive signal fed to the optical deflector 66 depends on the wobbling signal, the position of the beam spot on the master disc 72 is radially deviated from the virtual central line of the related track. As a result, irregular pits or wobbling pits are formed in the master disc 72 as shown in FIG. 1(A).

Second Embodiment

1. Optical Disc

An optical disc has a sequence or train of pits which extends along a track. FIG. 10(A) shows an example of an unusual pit train having a duty factor smaller than 50%. FIG. 10(B) shows an example of a normal pit train having a duty factor of 50%. FIG. 10(C) shows an example of an unusual pit train having a duty factor greater than 50%.

An RF signal waveform shown in FIG. 11 results from the reproduction of information from the normal 50%-duty pit train of FIG. 10(B). The RF signal waveform of FIG. 11 is symmetrical with respect to the horizontally-extending center line thereof. A slicing level is centered at the RF signal waveform of FIG. 11. In FIG. 11, the slicing level extends through the centers of hatched rhombic portions of the RF signal waveform which are referred to as "eyes".

The unusual pit train of FIG. 10(A) results from subjecting a record signal to duty-factor correction. The length in the horizontal direction (namely, in the tangential direction) of each pit of FIG. 10(A) is smaller than that of each pit of FIG. 10(B) by twice a value "a". When information is reproduced from the unusual pit train of FIG. 10(A), the waveform symmetry of the resultant RF signal is lost and the slicing level is shifted upward in FIG. 11.

The unusual pit train of FIG. 10(C) results from subjecting a record signal to duty-factor correction. The length in the horizontal direction (namely, in the tangential direction) of each pit of FIG. 10(C) is greater than that of each pit of FIG. 10(B) by twice a value "b". When information is reproduced from the unusual pit train of FIG. 10(C), the waveform symmetry of the resultant RF signal is lost and the slicing level is shifted downward in FIG. 11.

As understood from the previous description, the slicing level moves up and down or zigzags in accordance with a variation in the duty factor of the pit train. Generally, unusual pit trains of FIG. 10(A) or 10(C) and normal pit trains of FIG. 10(B) are alternately arranged in a given zone (a given track segment) of the optical disc so that the slicing level will periodically change during the reproduction of information from the given zone.

Figure 12A:
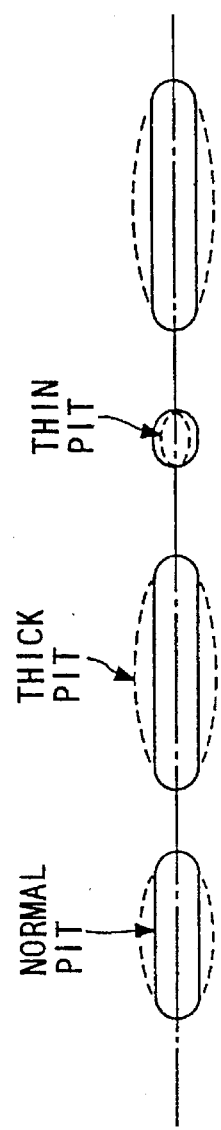
FIG. 12(A) is a time-domain diagram of trains of normal pits, thick and thin pits.
Figure 12B:
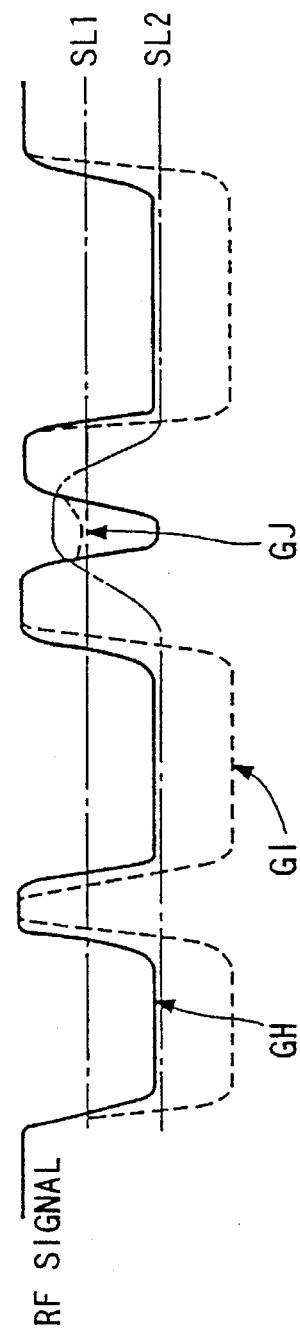
FIG. 12(B) is a time-domain diagram of RF signals and related slicing levels which are generated during the scanning of the pit trains in FIG. 12(A).

FIG. 12(A) shows other examples of the train of pits which cause changes in the slicing level for the RE signal. In FIG. 12(A), the width in the radial direction of each unusual pit, which is denoted by dotted curves, is made larger or smaller than the corresponding width of each normal pit denoted by solid curves. FIG. 12(B) illustrates the waveforms of RF signals generated by reproducing information from the pits in FIG. 12(A). Specifically, the RF signal corresponding to a normal pit has a waveform as denoted by a curve GH in FIG. 12(B), and relates to a slicing level SL1. In the case of a thick pit (an unusual pit) greater in radial width than a normal pit, the reflectance is relatively large and thus the modulation factor is also relatively great. Accordingly, the RF signal corresponding to the thick pit has a waveform denoted by a curve GI in FIG. 12(B), and the related slicing level drops to SL2. In the case of a thin pit (an unusual pit) smaller in radial width than a normal pit, the reflectance and the modulation factor are relatively small. Accordingly, the RF signal corresponding to the thin pit has a waveform denoted by a curve GJ in FIG. 12(B), and the related slicing level moves upward. Generally, groups of unusual pits (thick pits or thin pits) and groups of normal pits are alternately arranged in a given zone of the optical disc so that the slicing level will periodically change during the reproduction of information from the given zone.

2. Reproduction Device

Figure 13:
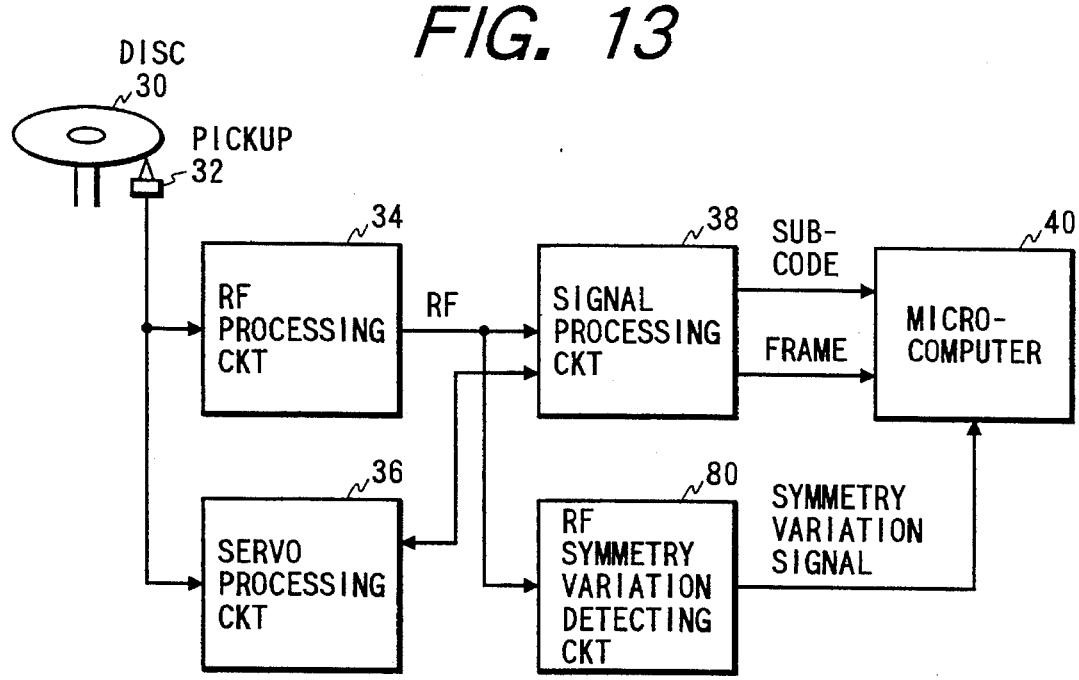
FIG. 13 is a block diagram of a reproduction device in the second embodiment.

FIG. 13 shows a reproduction device which is similar to the reproduction device of FIG. 4 except that an RF symmetry variation detecting circuit 80 replaces the burst tracking error detection circuit 42 (see FIG. 4). The RF symmetry variation detecting circuit 80 is connected between an RF processing circuit 34 and a microcomputer 40. The RF symmetry variation detecting circuit 80 receives an RF signal from the RF processing circuit 34, and detects the variation in symmetry of the slicing level thereof. The RF symmetry variation detecting circuit 80 feeds the microcomputer 40 with a detection signal representing a result of the detection.

Figure 14:
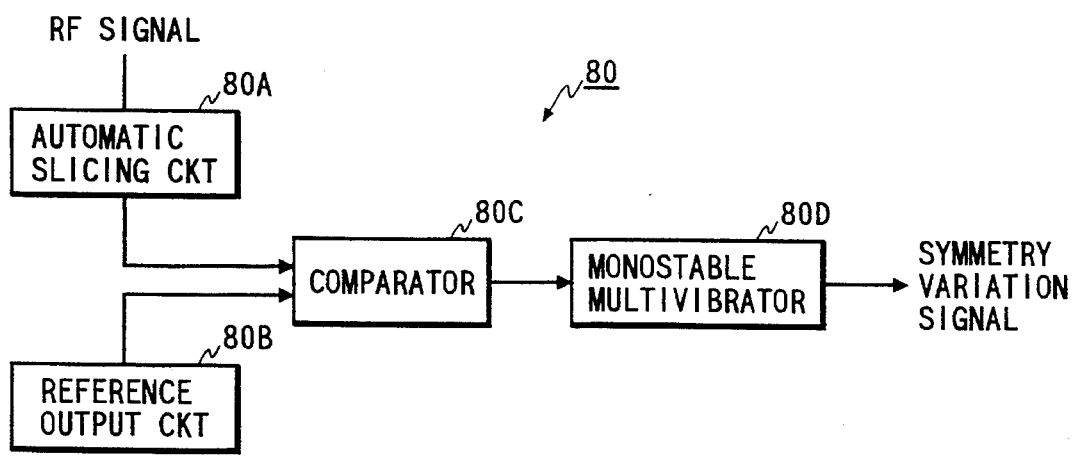
FIG. 14 is a block diagram of an RF symmetry variation detecting circuit in FIG. 13.

As shown in FIG. 14, the RF symmetry variation detecting circuit 80 includes an automatic slicing circuit 80A, a reference output circuit 80B, a comparator 80C, and a monostable multivibrator 80D. The automatic slicing circuit 80A receives an RF signal from the RF processing circuit 34 (see FIG. 13). The output terminal of the automatic slicing circuit 80A is connected to a first input terminal of the comparator 80C. The output terminal of the reference output circuit 80B is connected to a second input terminal of the comparator 80C. The comparator 80C is followed by the monostable multivibrator 80D. The output terminal of the monostable multivibrator 80D is connected to the microcomputer 40 (see FIG. 13).

Figure 15:
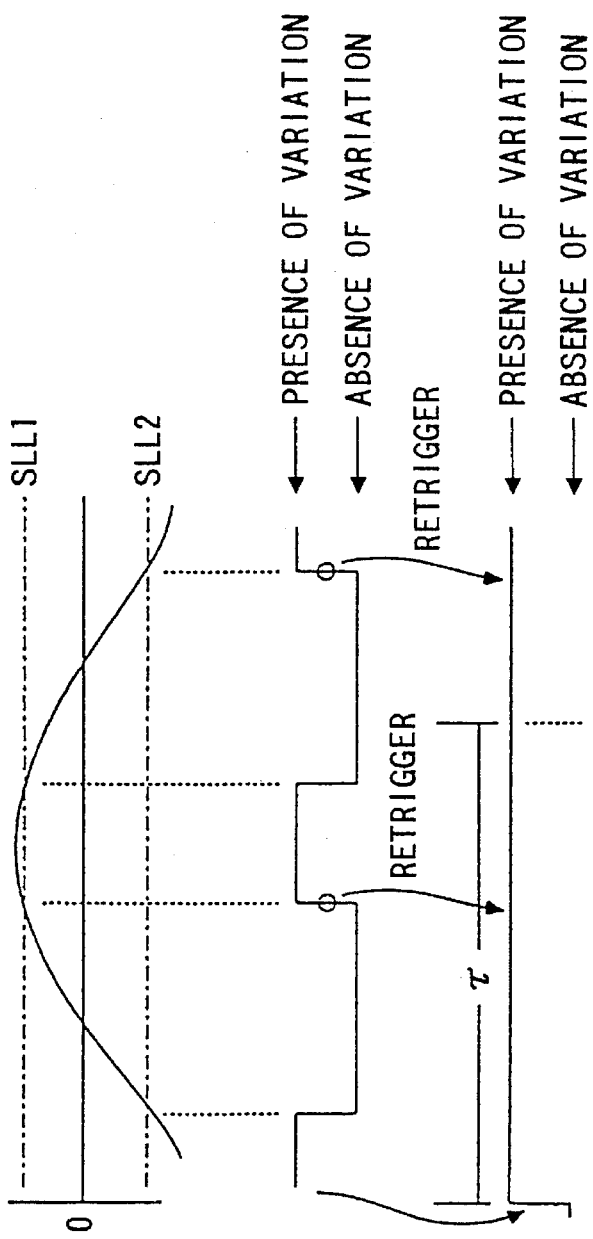
FIG. 15(A) is a time-domain diagram of a slicing level and upper and lower limits in the RF symmetry variation detecting circuit of FIG. 14.
FIGS. 15(B) and 15(C) are time-domain diagrams of signals in the RF symmetry variation detecting circuit of FIG. 14.

During the reproduction of information from an unusual pit train, eyes in the waveform of the RF signal outputted from the RF processing circuit 34 are displaced upward or downward from normal positions. The slicing level related to the RF signal varies accordingly. FIG. 15(A) illustrates an example of a variation in the slicing level. The automatic slicing circuit 80A detects such a variation, and generates a signal representing the slicing level. The automatic slicing circuit 80A outputs the slicing level signal to the comparator 80C.

The comparator 80C receives the output signals of the reference output circuit 80B which represent predetermined upper and lower limits SLL1 and SLL2 (see FIG. 15(A)). The comparator 80C compares the slicing level with the upper and lower limits SLL1 and SLL2, generating and outputting a slicing level variation signal. As shown in FIGS. 15(A) and 15(B), the slicing level variation signal is "H" when the slicing level is higher than the upper limit SLL1 or smaller than the lower limit SLL2. The slicing level variation signal is "L" when the slicing level is between the upper limit SLL1 and the lower limit SLL2. The comparator 80C outputs the slicing level variation signal to the monostable multivibrator 80D.

The monostable multivibrator 80D is triggered by a change of the slicing level variation signal from "L" to "H", outputting an "H" pulse as shown in FIG. 15(C). The monostable multivibrator 80D has a predetermined time constant "t" determining the duration of the output "H" pulse. The monostable multivibrator 80D is of the retriggerable type. The output signal of the monostable multivibrator 80D constitutes a signal representative of a symmetry variation. The symmetry variation signal is "H" when information is reproduced from the unusual pit train. The symmetry variation signal is "L" when information is reproduced from a train of normal pits. The monostable multivibrator 80D outputs the symmetry variation signal to the microcomputer 40.

The microcomputer 40 responds to the symmetry variation signal instead of the burst tracking error signal. At the timing QC in FIG. 7(E) which follows the timing QB by the given interval, the microcomputer 40 reads or samples the symmetry variation signal. The step S8 in FIG. 8 is modified to read the symmetry variation signal. Furthermore, the steps S10 and S12 in FIG. 8 are modified to decide whether or not a symmetry variation is present by referring to the symmetry variation signal.

A practical example of the automatic slicing circuit 80A is an IC "TC9263F" manufactured by Toshiba Corporation which is capable of outputting a signal indicating the slicing level.

3. Recording Device

Figure 16:
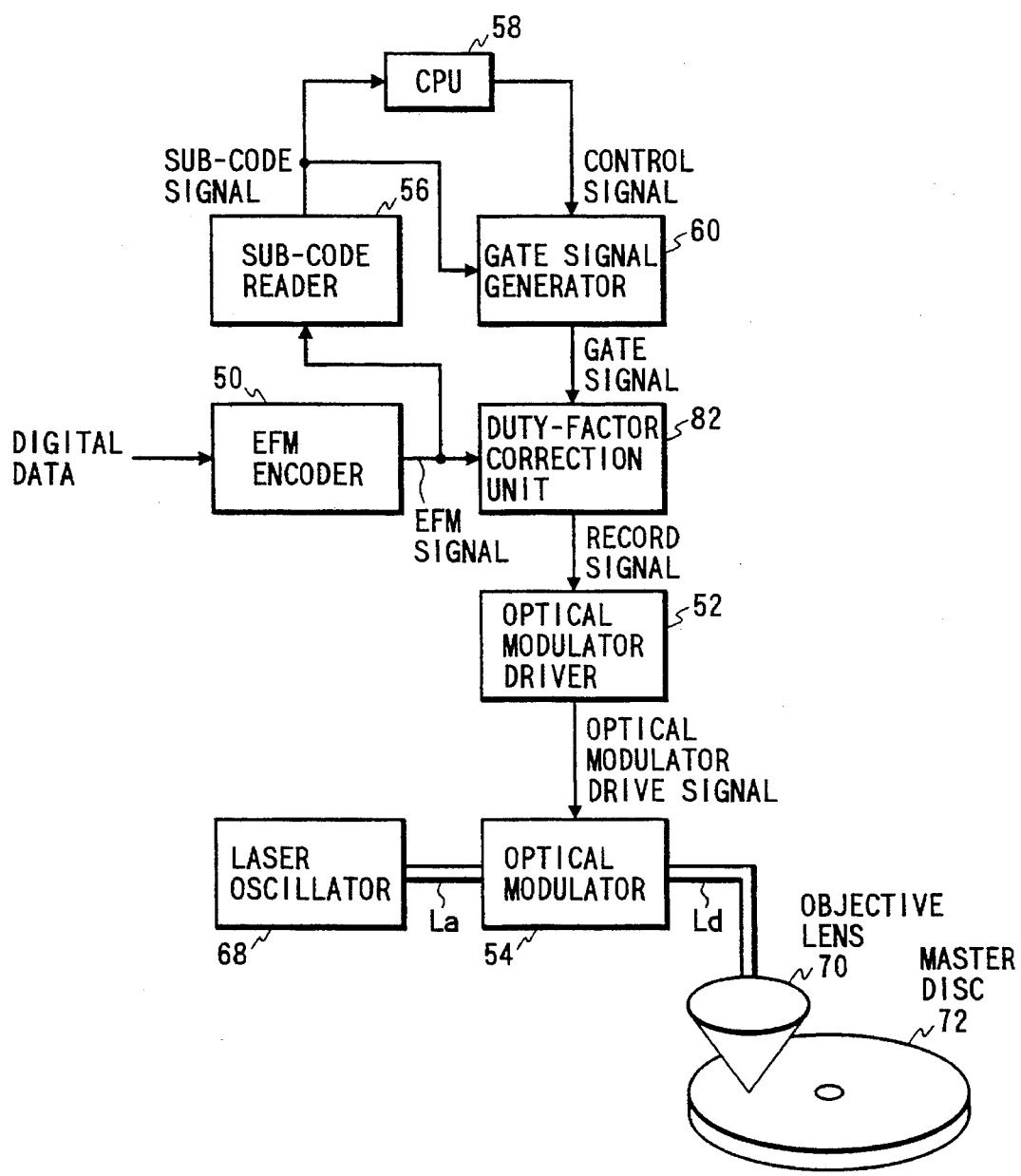
FIG. 16 is a block diagram of a recording device in the second embodiment.

With reference to FIG. 16, a recording device (a mastering machine) includes an EFM encoder 50 which is followed by a sub-code reader 56 and a duty-factor correction unit 82. The sub-code reader 56 is connected to a CPU 58 and a gate signal generator 60. The CPU 58 is connected to the gate signal generator 60. The gate signal generator 60 is connected to the duty-factor correction unit 82. The duty-factor correction unit 82 is connected to an optical modulator driver 52. The optical modulator driver 52 is electrically connected to an optical modulator 54.

The recording device of FIG. 16 includes a laser oscillator 68 which is successively followed by the optical modulator 54 and an objective lens 70. A master disc 72 is set in a place exposed to a light beam outputted from the objective lens 70.

Digital data representing, for example, software for a television game or a computer game, is inputted into the EFM encoder 50, being encoded thereby into an EFM signal. The EFM encoder 50 outputs the EFM signal to the sub-code reader 56 and the duty-factor correction unit 82. The sub-code reader 56 extracts a sub-code signal from the EFM signal. The sub-code reader 56 outputs the sub-code signal to the CPU 58 and the gate signal generator 60. The CPU 58 continuously monitors address information in the sub-code signal. The CPU 58 outputs a control signal pulse to the gate signal generator 60 when a current address represented by the address information moves into agreement with a predetermined address at which a copy protection code (a symmetry variation signal) should be recorded. The output signal of the CPU 58 has a waveform such as shown in FIG. 17(B).

The gate signal generator 60 produces a gate signal in response to the sub-code signal and the control signal pulse. The produced gate signal is synchronized with a sub-code frame. The produced gate signal has a waveform such as shown in FIG. 17(C). The gate signal corresponds to a copy protection code. As shown in FIGS. 17(A) and 17(C), the gate signal is of a logic value of "H" during every even-numbered sub-code frame. The gate signal is of a logic value of "L" during every odd-numbered sub-code frame. It should be noted that the gate signal may be of a logic value of "H" and a logic value of "L" during every odd-numbered sub-code frame and every even-numbered sub-code frame respectively. The gate signal generator 60 outputs the gate signal to the duty-factor correction unit 82.

The duty-factor correction unit 82 subjects the EFM signal to given duty-factor correction when the gate signal is "H", that is, when the present sub-code frame is even-numbered. The duty-factor correction is designed to change the duty factor from 50%. The duty-factor correction unit 82 outputs the correction-resultant signal to the optical modulator driver 52. On the other hand, the duty-factor correction unit 82 transmits the EFM signal to the optical modulator driver 52 without correcting the EFM signal when the gate signal is "L", that is, when the present sub-code frame is odd-numbered. The output signal of the duty-factor correction unit 82 constitutes a record signal synchronized with the sub-code frame. The duty-factor correction unit 82 feeds the record signal to the optical modulator driver 52. The optical modulator driver 52 generates a drive signal for the optical modulator 54 in response to the record signal. The optical modulator driver 52 outputs the drive signal to the optical modulator 54.

The laser oscillator 68 continuously applies a laser light beam La to the optical modulator 54. The laser light beam La passes through the optical modulator 54 while being intensity-modulated thereby in response to the drive signal fed from the optical modulator driver 52. Thus, the optical modulator 54 converts the laser light beam La into a second laser light beam (a modulation-resultant laser light beam) Ld. The second laser light beam Ld is propagated from the optical modulator 54 to the objective lens 70. The second laser light beam Ld passes through the objective lens 70 before being focused thereby into a spot on the master disc 72. The beam spot forms pits in the master disc 72 while the master disc 72 is rotated by a suitable drive device (not shown). As a result of the operation of the duty-factor correction unit 82, unusual pits are formed along a track segment corresponding to every even-numbered frame as shown in FIGS. 17(A) and 17(D). On the other hand, normal pits are formed along a track segment corresponding to every odd-numbered frame as shown in FIGS. 17(A) and 17(D).

As shown in FIGS. 17(A) and 17(E), the slicing level of the RF signal reproduced from such an optical disc varies in synchronism with the sub-code frame. The RF symmetry variation detecting circuit 80 in the reproduction device of FIG. 13 converts the slicing level signal of FIG. 17(E) into a detection signal (a symmetry variation signal) having a waveform such as shown in FIG. 17(F).

Third Embodiment

1. Optical Disc

An optical disc has a sequence of pits which extends along a track. FIG. 18(A) illustrates an example of a pit sequence having trains of unusual pits and trains of normal pits. A normal pit is defined as having a standard radial with (a normal radial width). An unusual pit is defined as having a radial width greater or smaller than the standard radial width. FIG. 18(B) illustrates the waveform of a signal reproduced from the pit sequence of FIG. 18(A). The level of the reproduced signal varies as a function of a reflectance of the optical disc. In FIG. 18(B), an upper part of the waveform corresponds to a greater reflectance of the optical disc while a lower part thereof corresponds to a smaller reflectance of the optical disc.

The radial width of each unusual pit in the former unusual pit train in FIG. 18(A) is greater than that of each normal pit by twice a value "a". As shown in FIG. 18(B), the amplitude of the reproduced signal corresponding to the former unusual pit train is relatively large while the reflectance of the optical disc is relatively low. The radial width of each unusual pit in the latter unusual pit train in FIG. 18(A) is smaller than that of each normal pit by twice a value "b". As shown in FIG. 18(B), the amplitude of the reproduced signal corresponding to the latter unusual pit train is relatively small while the reflectance of the optical disc is relatively high.

Generally, unusual pit trains and normal pit trains are alternately arranged in a given zone of the optical disc so that the reflectance-related component of a reproduced signal will periodically change during the reproduction of information from the given zone.

2. Reproduction Device

Figure 19:
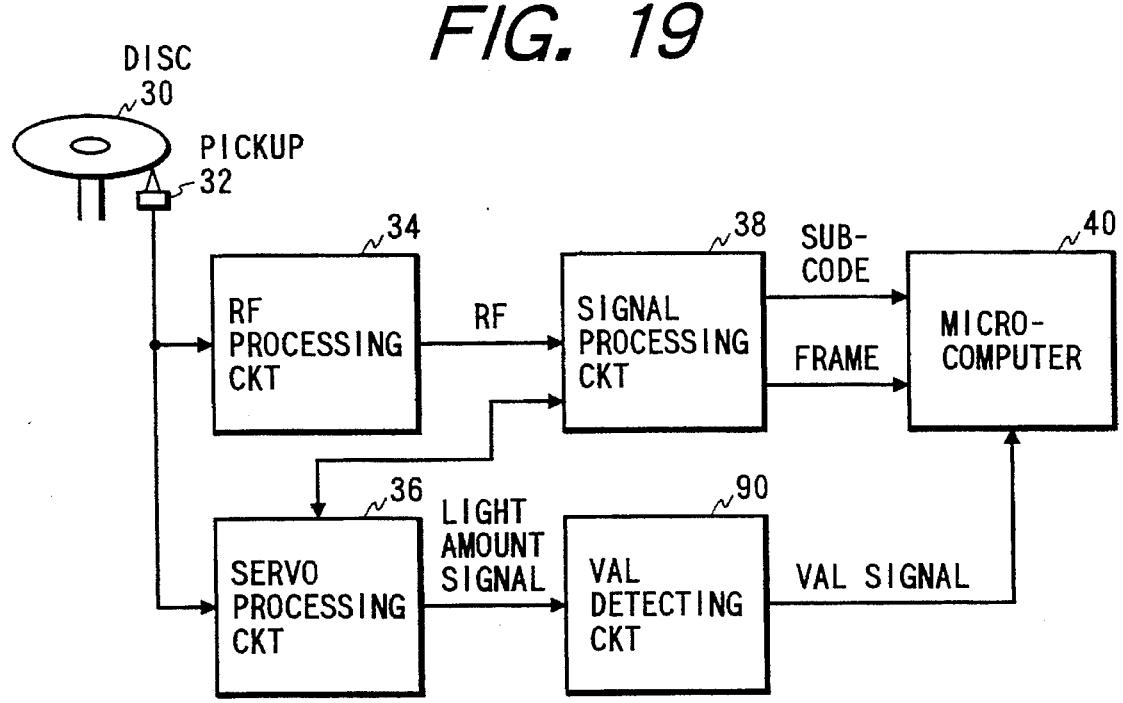
FIG. 19 is a block diagram of a reproduction device in the third embodiment.

FIG. 19 shows a reproduction device which is similar to the reproduction device of FIG. 4 except that a VAL (variation-in-amount-of-light) detecting circuit 90 replaces the burst tracking error detection circuit 42 (see FIG. 4). The VAL detecting circuit 90 is connected between a servo processing circuit 36 and a microcomputer 40. The VAL detecting circuit 90 receives light amount signals from the servo processing circuit 36, and detects a variation in a light amount in response to the light amount signals. The VAL detecting circuit 90 feeds the microcomputer 40 with a detection signal or a VAL signal representing a result of the detection.

Figure 20:
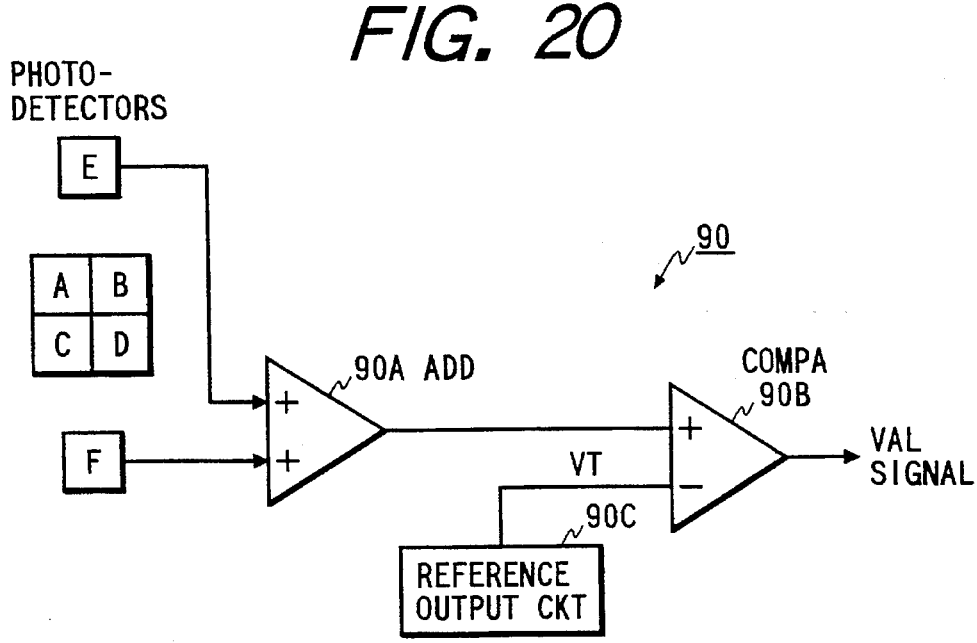
FIG. 20 is a block diagram of a VAL detecting circuit in FIG. 19.

As shown in FIG. 20, the VAL detecting circuit 90 includes an adder 90A, a comparator 90B, and a reference output circuit 90C. The adder 90A receives light amount signals from photodetectors E and F in an optical pickup head 32 (see FIG. 19) via the servo processing circuit 36 (see FIG. 19). The photodetectors E and F are located to sense reflected light beams corresponding to side beam spots (sub beam spots) on the optical disc. The output terminal of the adder 90A is connected to a first input terminal of the comparator 90B. The output terminal of the reference output circuit 90C is connected to a second input terminal of the comparator 90B. The output terminal of the comparator 90B is connected to the microcomputer 40 (see FIG. 19).

The adder 90A combines or adds the light mount signals into a composite light amount signal corresponding to "E+F". The adder 90A outputs the composite light mount signal to the comparator 90B. The adder 90A may be connected to photodetectors A, B, C, and D composing a 4-segment sensor for detecting a reflected light beam related to a main beam spot on the optical disc. In this case, the output signal of the adder 90A corresponds to "A+B+C+D".

The comparator 90B receives the output signal of the reference output circuit 90C which represents a predetermined reference level VT. The comparator 90B compares the composite light amount signal with the reference level VT, generating and outputting a VAL signal. The VAL signal is "H" when the level of the composite light mount signal exceeds to the reference level VT. Otherwise, the VAL signal is "L". The comparator 90B outputs the VAL signal to the microcomputer 40.

The microcomputer 40 responds to the VAL signal instead of the burst tracking error signal. At the timing QC in FIG. 7(E) which follows the timing QB by the given interval, the microcomputer 40 reads or samples the VAL signal. The step S8 in FIG. 8 is modified to read the VAL signal. Furthermore, the steps S10 and S12 in FIG. 8 are modified to decide whether or not a light amount variation is present by referring to the VAL signal.

3. Recording Device

Figure 21:
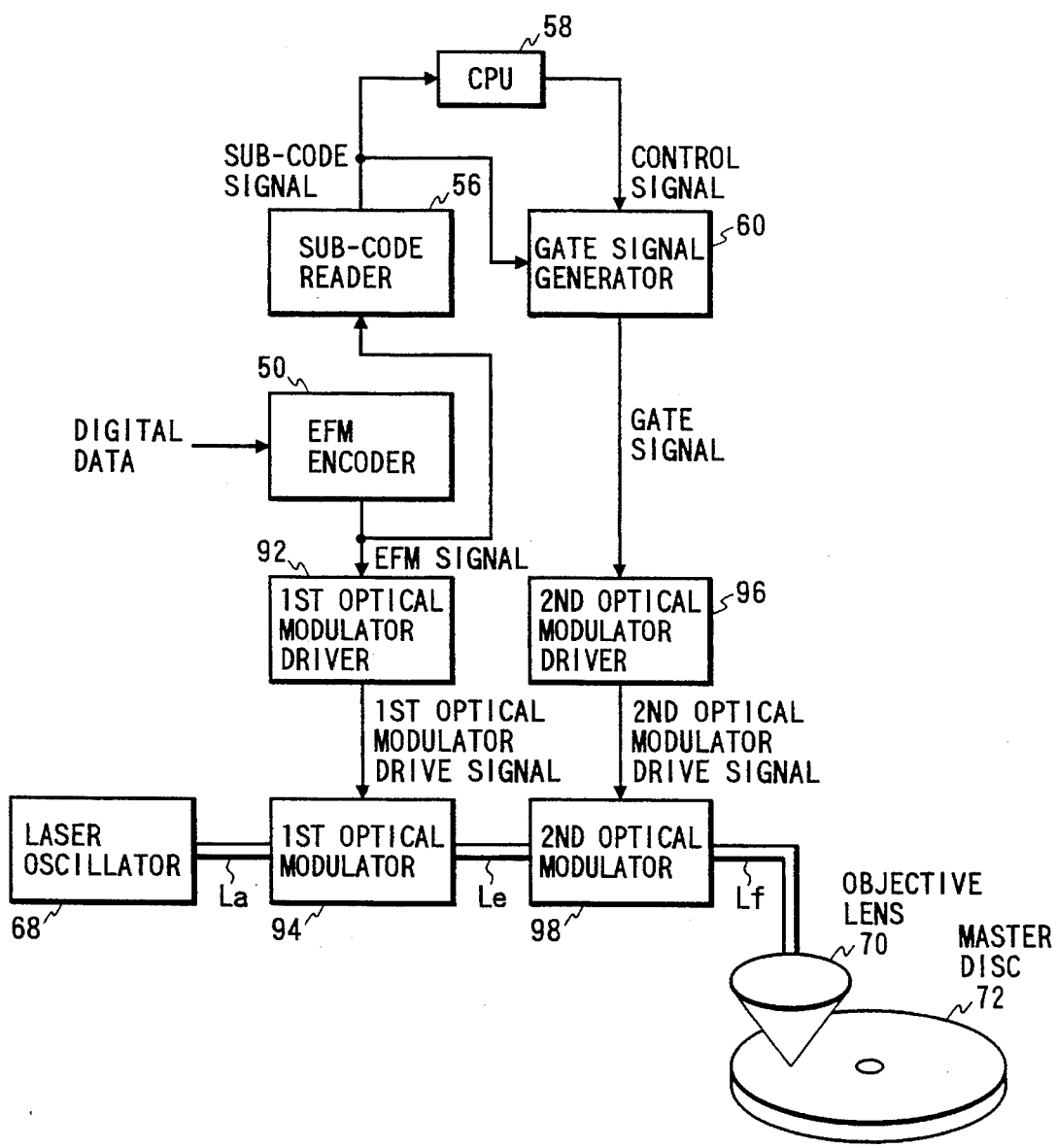
FIG. 21 is a block diagram of a recording device in the third embodiment.

With reference to FIG. 21, a recording device (a mastering machine) includes an EFM encoder 50 which is followed by a first optical modulator driver 92 and a sub-code reader 56. The first optical modulator driver 92 is electrically connected to a first optical modulator 94. The sub-code reader 56 is connected to a CPU 58 and a gate signal generator 60. The CPU 58 is connected to the gate signal generator 60. The gate signal generator 60 is followed by a second optical modulator driver 96. The second optical modulator driver 96 is electrically connected to a second optical modulator 98.

The recording device of FIG. 21 includes a laser oscillator 68 which is successively followed by the first optical modulator 94, the second optical modulator 98, and an objective lens 70. A master disc 72 is set in a place exposed to a light beam outputted from the objective lens 70.

Digital data representing, for example, software for a television game or a computer game, is inputted into the EFM encoder 50, being encoded thereby into an EFM signal. The EFM encoder 50 outputs the EFM signal to the first optical modulator driver 92 and the sub-code reader 56. The first optical modulator driver 92 generates a drive signal for the first optical modulator 94 in response to the EFM signal. The first optical modulator driver 92 outputs the drive signal to the first optical modulator 94.

The sub-code reader 56 extracts a sub-code signal from the EFM signal. The sub-code reader 56 outputs the sub-code signal to the CPU 58 and the gate signal generator 60. The CPU 58 continuously monitors address information in the sub-code signal. The CPU 58 outputs a control signal pulse to the gate signal generator 60 when a current address represented by the address information moves into agreement with a predetermined address at which a copy protection code (a VAL signal) should be recorded. The output signal of the CPU 58 has a waveform such as shown in FIG. 22(B).

The gate signal generator 60 produces a gate signal in response to the sub-code signal and the control signal pulse. The produced gate signal is synchronized with a sub-code frame. The produced gate signal has a waveform such as shown in FIG. 22(C). The gate signal corresponds to a copy protection code. As shown in FIGS. 22(A) and 22(C), the gate signal is of a logic value of "H" during every even-numbered sub-code frame. The gate signal is of a logic value of "L" during every odd-numbered sub-code frame. It should be noted that the gate signal may be of a logic value of "H" and a logic value of "L" during every odd-numbered sub-code frame and every even-numbered sub-code frame respectively. The gate signal generator 60 outputs the gate signal to the second optical modulator driver 96.

The second optical modulator driver 96 generates a drive signal for the second optical modulator 98 in response to the gate signal. The second optical modulator driver 96 outputs the drive signal to the second optical modulator 98.

The laser oscillator 68 continuously applies a laser light beam La to the first optical modulator 94. The laser light beam La passes through the first optical modulator 94 while being intensity-modulated thereby in response to the drive signal fed from the first optical modulator driver 92. Thus, the first optical modulator 94 converts the laser light beam La into a second laser light beam (a modulation-resultant laser light beam) Le. The second laser light beam Le is propagated from the first optical modulator 94 to the second optical modulator 98. The second laser light beam Le passes through the second optical modulator 98 while being modulated thereby in response to the drive signal fed from the second optical modulator driver 96. Thus, the second optical modulator 98 converts the second laser light beam Le into a third laser light beam (a modulation-resultant laser light beam) Lf. The light beam modulation by the second optical modulator 98 is designed to change a radial dimension (a redial width) of a beam spot on the master disc 72.

The third laser light beam Lf is propagated from the second optical modulator 98 to the objective lens 70. The third laser light beam Lf passes through the objective lens 70 before being focused thereby into a spot on the master disc 72. The beam spot forms pits in the master disc 72 while the master disc 72 is rotated by a suitable drive device (not shown). As a result of the operation of the second optical modulator 98, unusual pits are formed along a track segment corresponding to every even-numbered frame as shown in FIGS. 22(A) and 22(D). On the other hand, normal pits are formed along a track segment corresponding to every odd-numbered frame as shown in FIGS. 22(A) and 22(D).

As shown in FIGS. 22(A) and 22(E), the envelope or the level of the composite light mount signal outputted from the adder 90A in the VAL detecting circuit 90 (see FIG. 19) varies in synchronism with the sub-code frame. The VAL detecting circuit 90 converts the composite light mount signal of FIG. 22(E) into a detection signal (a VAL signal) having a waveform such as shown in FIG. 22(F).

Fourth Embodiment

1. Optical Disc

As shown in FIG. 23(A), an optical disc has a sequence or an arrangement of pits which extends along a track. The pit arrangement of FIG. 23(A) includes a normal pit train and an unusual pit train at a left-hand side and a right-hand side of the drawing respectively. The normal pit train consists of normal pits. The unusual pit train consists of normal pits and unusual pits. The central line of each normal pit which extends along the related track agrees with the central line of the track in conformity with the ordinary standards. In addition, each normal pit is symmetrical with respect to the central line thereof (that is, the central line of the track). On the other hand, the central line of each unusual pit which extends along the related track is inwardly or outwardly (radially) offset from the central line of the track. Specifically, in FIG. 23(A), the portion of each unusual pit which extends below the track central line is greater in radial width and area than the remaining portion thereof (the portion extending above the track central line). When the pit arrangement of FIG. 23(A) is scanned along the track, a resultant tracking error signal TE has a waveform shown in FIG. 23(B).

An optical pickup head applies three light beam spots to the optical disc. The three light beam spots include a main beam spot BS2 and side beam spots BS1 and BS3 (see FIG. 23(A)). The side beam spots BS1 and BS3 are radially offset from the main beam spot BS2 in opposite directions respectively. The tracking error signal TE is generated on the basis of the difference between the amounts of reflected light which relate to the side beam spots BS1 and BS3 respectively.

During the scanning of a normal pit train (see the left-hand region of FIG. 23(A)) by the beam spots BS1, BS2, and BS3, the mounts of reflected light related to the side beam spots BS1 and BS3 are substantially equal to each other since each normal pit is symmetrical with respect to the track central line. Therefore, in this case, the level of the resultant tracking error signal TE is substantially null (that is, "0").

During the scanning of an unusual pit train (see the right-hand region of FIG. 23(A)) by the beam spots BS1', BS2', and BS3', unusual pits periodically cause remarkable differences between the amounts of reflected light related to the side beam spots BS1' and BS3' since the unusual pits are not symmetrical with respect to the track central line. Therefore, in this case, the level of the resultant tracking error signal TE periodically increases from the null level in a burst manner.

Such an unusual pit train causing a burst-shaped tracking error signal TE is periodically and intermittently recorded on a predetermined track or tracks on a legitimate optical disc in data-block units. During the reproduction of information from such a track region of an optical disc, if a burst signal is generated in synchronism with every data block, the optical disc can be judged to be legitimate. If not, the optical disc can be judged to be illegal.

FIG. 24(D) shows an example of a sequence of pits which includes normal pit trains and unusual pit trains. The arrangement of the unusual pit trains is in logic units of a related track. For example, the arrangement of the unusual pit trains has a given relation with frames of the track (see FIG. 24(A)). Specifically, the unusual pit trains are in even-numbered frames respectively while the normal pit trains occupy odd-numbered frames respectively. During the reproduction of information from the optical disc, a resultant tracking error signal TE has a waveform of FIG. 24(E). As shown in FIG. 24(E), a burst signal is periodically caused in the tracking error signal TE by each of the unusual pit trains (see FIG. 24(D)).

2. Reproduction Device

A reproduction device in this embodiment is similar to the reproduction device of FIG. 4. Accordingly, a description thereof will be omitted.

3. Recording Device

Figure 26:
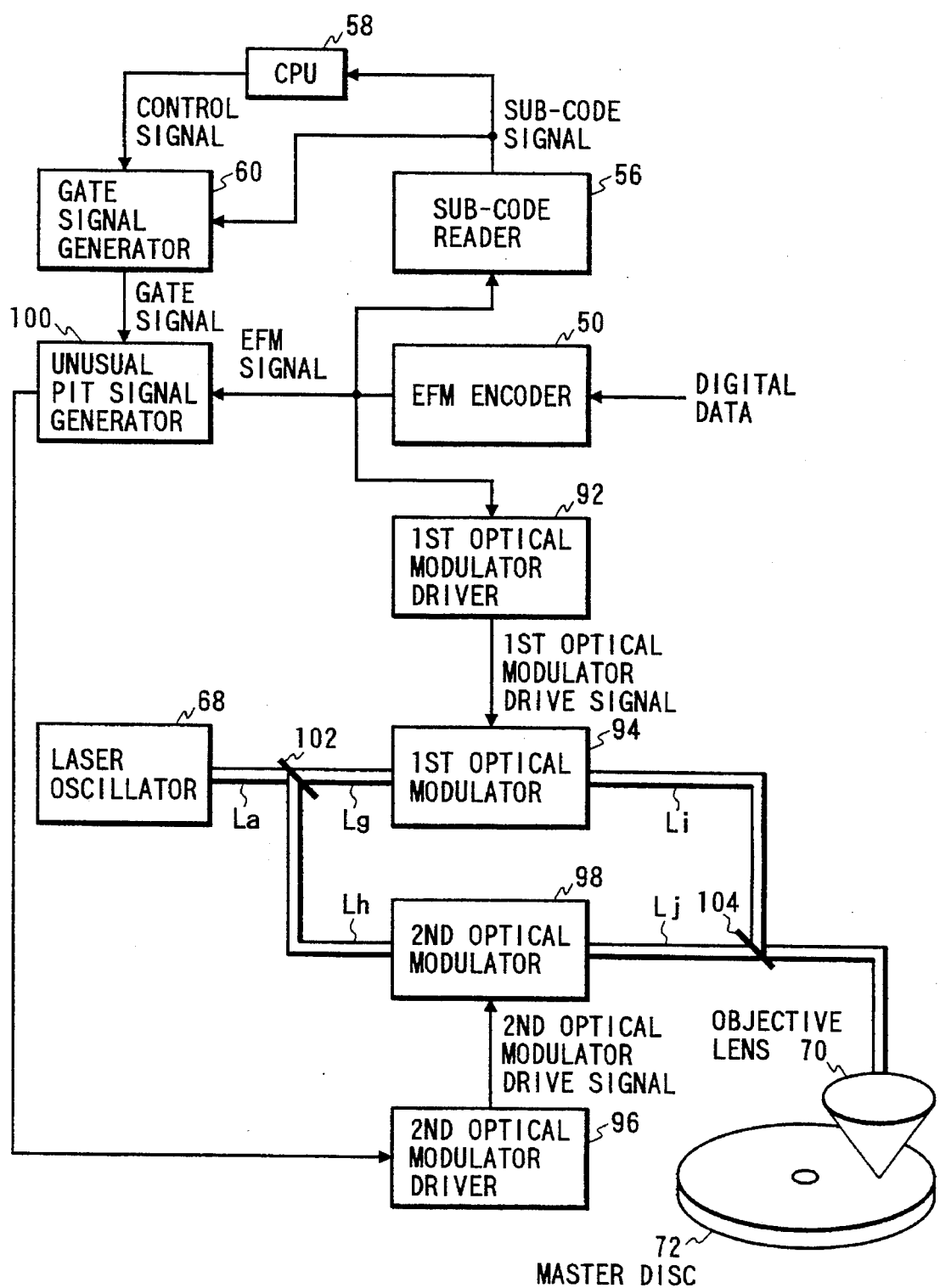
FIG. 26 is a block diagram of a recording device in the fourth embodiment.

With reference to FIG. 26, a recording device (a mastering machine) includes an EFM encoder 50 which is followed by a first optical modulator driver 92, a sub-code reader 56, an unusual pit signal generator 100. The first optical modulator driver 92 is electrically connected to a first optical modulator 94. The sub-code reader 56 is connected to a CPU 58 and a gate signal generator 60. The CPU 58 is connected to the gate signal generator 60. The gate signal generator 60 is connected to the unusual pit signal generator 100. The unusual pit signal generator 100 is followed by a second optical modulator driver 96. The second optical modulator driver 96 is electrically connected to a second optical modulator 98.

The recording device of FIG. 26 includes a laser oscillator 68 which is followed by a beam splitter 102. The beam splitter 102 is followed by the first and second optical modulators 94 and 98 placed in parallel with each other. The output sides of the first and second optical modulators 94 and 98 are optically connected to a beam combining unit 104 including a polarization beam splitter. The beam combining unit 104 is followed by an objective lens 70. A master disc 72 is set in a place exposed to a light beam outputted from the objective lens 70.

Digital data representing, for example, software for a television game or a computer game, is inputted into the EFM encoder 50, being encoded thereby into an EFM signal. The EFM encoder 50 outputs the EFM signal to the first optical modulator driver 92, the sub-code reader 56, and the unusual pit signal generator 100. The first optical modulator driver 92 generates a drive signal for the first optical modulator 94 in response to the EFM signal. The first optical modulator driver 92 outputs the drive signal to the first optical modulator 94.

The sub-code reader 56 extracts a sub-code signal from the EFM signal. The sub-code reader 56 outputs the sub-code signal to the CPU 58 and the gate signal generator 60. The CPU 58 continuously monitors address information in the sub-code signal. The CPU 58 outputs a control signal pulse to the gate signal generator 60 when a current address represented by the address information moves into agreement with a predetermined address at which a copy protection code (a burst signal) should be recorded. The output signal of the CPU 58 has a waveform such as shown in FIG. 24(B).

The gate signal generator 60 produces a gate signal in response to the sub-code signal and the control signal pulse. The produced gate signal is synchronized with a sub-code frame. The produced gate signal has a waveform such as shown in FIG. 24(C). The gate signal corresponds to a copy protection code. As shown in FIGS. 24(A) and 24(C), the gate signal is of a logic value of "H" during every even-numbered sub-code frame. The gate signal is of a logic value of "L" during every odd-numbered sub-code frame. It should be noted that the gate signal may be of a logic value of "H" and a logic value of "L" during every odd-numbered sub-code frame and every even-numbered sub-code frame respectively. The gate signal generator 60 outputs the gate signal to the unusual pit signal generator 100.

FIG. 25(B) illustrates an example of the waveform of the EFM signal. While the gate signal remains "H" (that is, during an even-numbered frame), the unusual pit signal generator 100 selects pulses from among pulses of the EFM signal (see FIG. 25(B)) and transmits only the selected pulses to the second optical modulator driver 96. Thus, the output signal of the unusual pit signal generator 100 which constitutes an unusual pit signal has a waveform such as shown in FIG. 25(C). As will be made clear later, the selected pulses cause unusual pits. While the gate signal remains "L" (that is, during an odd-numbered frame), the unusual pit signal generator 100 continues to inhibit the transmission of the EFM signal to the second optical modulator driver 96. The second optical modulator driver 96 generates a drive signal for the second optical modulator 98 in response to the unusual pit signal. The second optical modulator driver 96 outputs the drive signal to the second optical modulator 98.

The laser oscillator 68 continuously applies a laser light beam La to the beam splitter 102. The laser light beam La is divided by the beam splitter 102 into a laser light beam Lg and a laser light beam Lh propagated to the first optical modulator 94 and the second optical modulator 98 respectively. The laser light beam Lg passes through the first optical modulator 94 while being intensity-modulated thereby in response to the drive signal fed from the first optical modulator driver 92. The modulation of the laser light beam Lg depends on the EFM signal (see FIG. 25(B)). Thus, the first optical modulator 94 converts the laser light beam Lg into another laser light beam (a modulation-resultant laser light beam) Li. The laser light beam Li is propagated from the first optical modulator 94 to the beam combining unit 104. The laser light beam Lh passes through the second optical modulator 98 while being intensity-modulated thereby in response to the drive signal fed from the second optical modulator driver 96. The modulation of the laser light beam Lh depends on the unusual pit signal (see FIG. 25(C)). Thus, the second optical modulator 98 converts the laser light beam Lh into another laser light beam (a modulation-resultant laser light beam) Lj. The laser light beam Lj is propagated from the second optical modulator 98 to the beam combining unit 104.

The laser light beam Li and the laser light beam Lj are added and combined by the beam combining unit 104, and then travel to the objective lens 70. The laser light beams Li and Lj pass through the objective lens 70 before being focused thereby into spots on the master disc 72. The beam spots form pits in the master disc 72 while the master disc 72 is rotated by a suitable drive device (not shown). As shown in FIG. 25(A), the beam spots caused by the laser light beams Li and Lj are offset from each other by an optical adjustment. The center of the beam spot caused by the laser light beam Li is on a track central line. Each of normal pits (for example, a pit PA in FIG. 25(A)) is formed by the laser light beam Li only. On the other hand, each of unusual pits (for example, a pit PB in FIG. 25(A)) is formed by a resultant of the laser light beams Li and Lj.

As shown in FIGS. 24(A) and 24(E), the tracking error signal TE which occurs during the reproduction of information from such an optical disc exhibits a burst-shaped variation synchronized with the sub-code frame. The reproduction device converts the tracking error signal TE of FIG. 24(E) into a detection signal having a waveform such as shown in FIG. 24(F).

Fifth Embodiment

1. Optical Disc

Figures 27A, 27B, 27C:
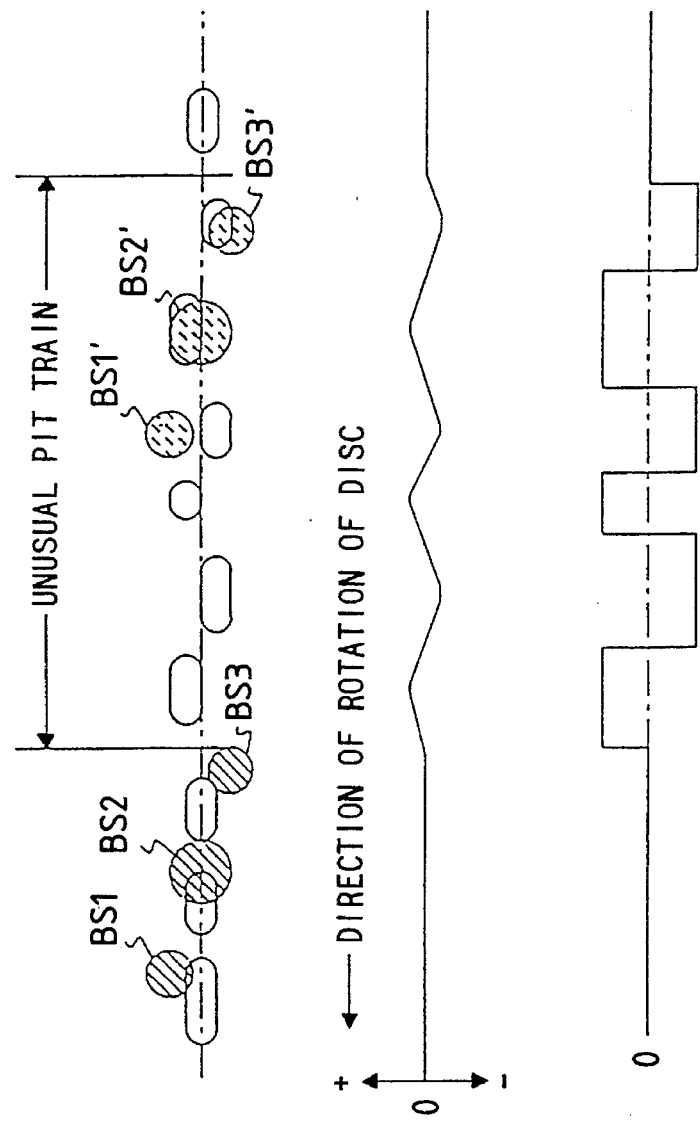
FIG. 27(A) is a diagram of a sequence of pits in an optical disc according to a fifth embodiment of this invention.
FIG. 27(B) is a time-domain diagram of a tracking error signal which is generated during the scanning of the pit sequence in FIG. 27(A).
FIG. 27(C) is a time-domain diagram of a wobbling signal generated in connection with the pit sequence of FIG. 27(A).

As shown in FIG. 27(A), an optical disc has a sequence or an arrangement of pits which extends along a track partially exhibiting a radial wobble. In other words, the optical disc has normal pits as well as wobbling pits. The pit arrangement of FIG. 27(A) includes a normal pit train and an irregular pit train (a wobbling pit train or an unusual pit train) at a left-hand side and a right-hand side of the drawing respectively. The normal pit train consists of normal pits. The irregular pit train consists of wobbling pits (unusual pits). The central line of each normal pit which extends along the related track agrees with the central line of the track in conformity with the ordinary standards. On the other hand, the unusual pits wobble around the track central line although the unusual pits are similar in shape to the normal pits. When the pit arrangement of FIG. 27(A) is scanned along the track, a resultant tracking error signal TE has a waveform shown in FIG. 27(B).

An optical pickup head applies three light beam spots to the optical disc. The three light beam spots include a main beam spot BS2 and side beam spots BS1 and BS3 (see FIG. 27(A)). The side beam spots BS1 and BS3 are radially offset from the main beam spot BS2 in opposite directions respectively. The tracking error signal TE is generated on the basis of the difference between the amounts of reflected light which relate to the side beam spots BS1 and BS3 respectively.

During the scanning of a normal pit train (see the left-hand region of FIG. 27(A)) by the beam spots BS1, BS2, and BS3, the amounts of reflected light related to the side beam spots BS1 and BS3 are substantially equal to each other. Therefore, in this case, the level of the resultant tracking error signal TE is substantially null (that is, "0") as shown in a left-hand region of FIG. 27(B).

During the scanning of an irregular pit train (see the right-hand region of FIG. 27(A)) by the beam spots BS1', BS2', and BS3', unusual pits cause a periodically-changing difference between the amounts of reflected light related to the side beam spots BS1' and BS3' since the unusual pits wobble around the track central line. Therefore, in this case, the level of the resultant tracking error signal TE periodically changes in a burst manner as shown in a right-hand region of FIG. 27(B).

Such an irregular pit train causing a burst-shaped tracking error signal TE is periodically and intermittently recorded on a predetermined track or tracks on a legitimate optical disc in data-block units. During the reproduction of information from such a track region of an optical disc, if a burst signal is generated in synchronism with every data block, the optical disc can be judged to be legitimate. If not, the optical disc can be judged to be illegal.

FIG. 28(D) shows an example of a sequence of pits which includes normal pit trains and irregular pit trains (unusual pit trains or wobbling pit trains). The arrangement of the irregular pit trains is in logic units of a related track. For example, the arrangement of the irregular pit trains has a given relation with frames of the track (see FIG. 28(A)). Specifically, the irregular pit trains are in even-numbered frames respectively while the normal pit trains occupy odd-numbered frames respectively. During the reproduction of information from the optical disc, a resultant tracking error signal TE has a waveform of FIG. 28(E). As shown in FIG. 28(E), a burst signal is periodically caused in the tracking error signal TE by each of the irregular pit trains (see FIG. 28(D)).

2. Reproduction Device

A reproduction device in this embodiment is similar to the reproduction device of FIG. 4. Accordingly, a description thereof will be omitted.

3. Recording Device

Figure 29:
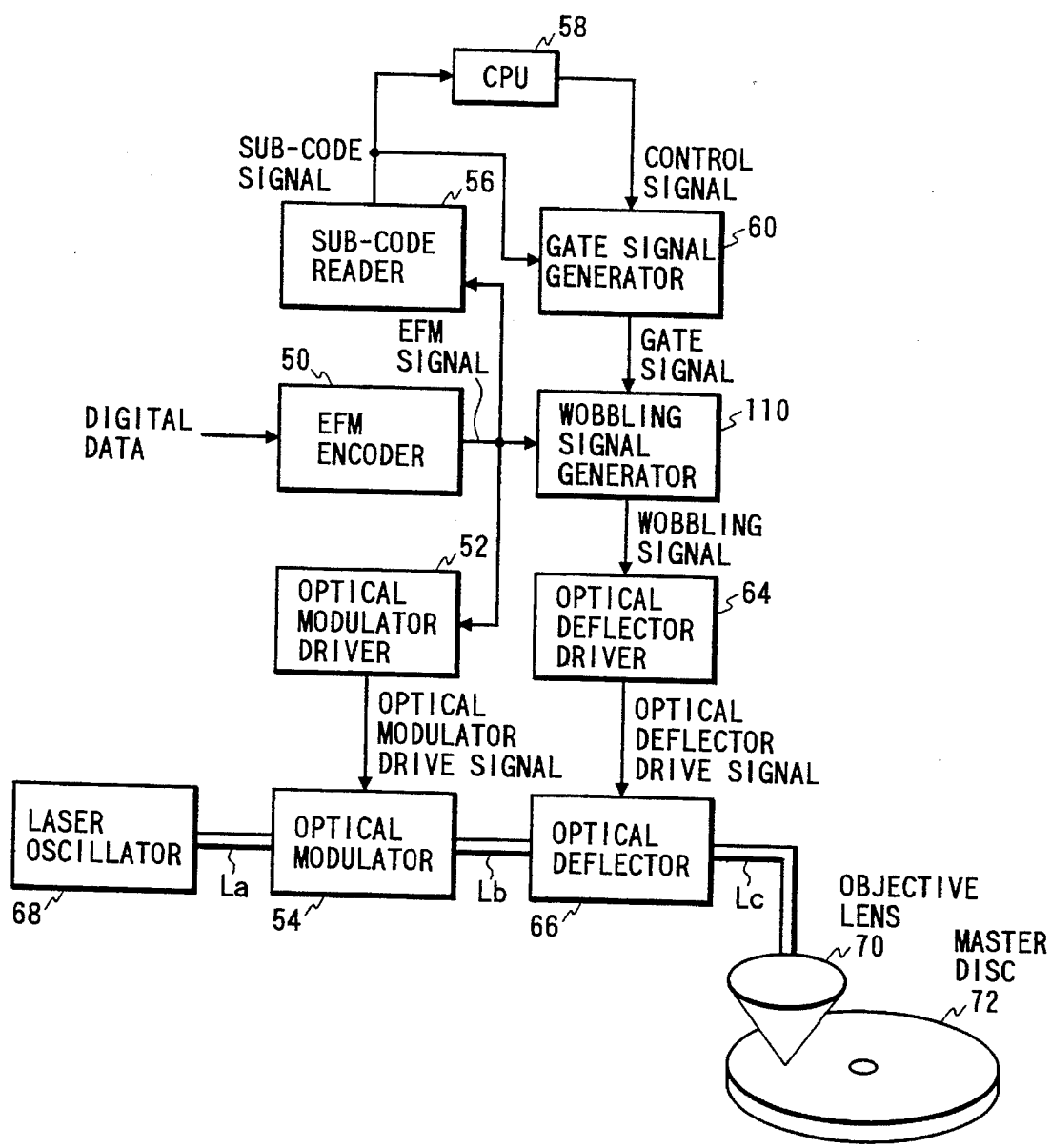
FIG. 29 is a block diagram of a recording device in the fifth embodiment.

With reference to FIG. 29, a recording device (a mastering machine) includes an EFM encoder 50 which is followed by an optical modulator driver 52, a sub-code reader 56, and a wobbling signal generator 110. The optical modulator driver 52 is electrically connected to an optical modulator 54. The sub-code reader 56 is connected to a CPU 58 and a gate signal generator 60. The CPU 58 is connected to the gate signal generator 60. The gate signal generator 60 is connected to the wobbling signal generator 110. The wobbling signal generator 110 is followed by an optical deflector driver 64. The optical deflector driver 64 is electrically connected to an optical deflector 66.

The recording device of FIG. 29 includes a laser oscillator 68 which is successively followed by the optical modulator 54, the optical deflector 66, and an objective lens 70. A master disc 72 is set in a place exposed to a light beam outputted from the objective lens 70.

Digital data representing, for example, software for a television game or a computer game, is inputted into the EFM encoder 50, being encoded thereby into an EFM signal. The EFM encoder 50 outputs the EFM signal to the optical modulator driver 52, the sub-code reader 56, and the wobbling signal generator 110. The optical modulator driver 52 generates a drive signal for the optical modulator 54 in response to the EFM signal. The optical modulator driver 52 outputs the drive signal to the optical modulator 54.

The sub-code reader 56 extracts a sub-code signal from the EFM signal. The sub-code reader 56 outputs the sub-code signal to the CPU 58 and the gate signal generator 60. The CPU 58 continuously monitors address information in the sub-code signal. The CPU 58 outputs a control signal pulse to the gate signal generator 60 when a current address represented by the address information moves into agreement with a predetermined address at which a copy protection code (a wobbling signal) should be recorded. The output signal of the CPU 58 has a waveform such as shown in FIG. 28(B).

The gate signal generator 60 produces a gate signal in response to the sub-code signal and the control signal pulse. The produced gate signal is synchronized with a sub-code frame. The produced gate signal has a waveform such as shown in FIG. 28(C). The gate signal corresponds to a copy protection code. As shown in FIGS. 28(A) and 28(C), the gate signal is of a logic value of "H" during every even-numbered sub-code frame. The gate signal is of a logic value of "L" during every odd-numbered sub-code frame. It should be noted that the gate signal may be of a logic value of "H" and a logic value of "L" during every odd-numbered sub-code frame and every even-numbered sub-code frame respectively. The gate signal generator 60 outputs the gate signal to the wobbling signal generator 110.

The wobbling signal generator 110 is activated and deactivated when the gate signal assumes "H" and "L" respectively. While the gate signal remains "H" (that is, during an even-numbered frame), the wobbling signal generator 110 produces a binary wobbling signal in response to the EFM signal. As shown in FIG. 27(C), the wobbling signal has a rectangular waveform corresponding to the EFM signal. The wobbling signal generator 110 outputs the wobbling signal to the optical deflector driver 64. While the gate signal remains "L" (that is, during an odd-numbered frame), the wobbling signal generator 110 remains inactive and continues to output a null signal rather than a wobbling signal. The null signal is fed to the optical deflector driver 64. The optical deflector driver 64 generates a drive signal for the optical deflector 66 in response to the output signal of the wobbling signal generator 110 which includes the wobbling signal. The optical deflector driver 64 outputs the drive signal to the optical deflector 66.

The laser oscillator 68 continuously applies a laser light beam La to the optical modulator 54. The laser light beam La passes through the optical modulator 54 while being intensity-modulated thereby in response to the drive signal fed from the optical modulator driver 52. Thus, the optical modulator 54 converts the laser light beam La into a second laser light beam (a modulation-resultant laser light beam) Lb. The second laser light beam Lb is propagated from the optical modulator 54 to the optical deflector 66. The second laser light beam Lb passes through the optical deflector 66 while being deflected thereby in response to the drive signal fed from the optical deflector driver 64. Thus, the optical deflector 66 converts the second laser light beam Lb into a third laser light beam (a deflection-resultant laser light beam) Lc.

The third laser light beam Lc is propagated from the optical deflector 66 to the objective lens 70. The third laser light beam Lc passes through the objective lens 70 before being focused thereby into a spot on the master disc 72. The beam spot forms pits in the master disc 72 while the master disc 72 is rotated by a suitable drive device (not shown). The optical deflector 66 causes the position of the beam spot on the master disc 72 to be radially deviated from a virtual central line of a related track in response to the drive signal fed from the optical deflector driver 64. Since the drive signal fed to the optical deflector 66 depends on the wobbling signal, the position of the beam spot on the master disc 72 is radially deviated from the virtual central line of the related track. As a result, wobbling pits are formed in the master disc 72 as shown in FIG. 27(A).

As shown in FIGS. 28(A) and 28(E), the tracking error signal TE which occurs during the reproduction of information from such an optical disc exhibits a burst-shaped variation synchronized with the sub-code frame. The reproduction device converts the tracking error signal TE of FIG. 28(E) into a detection signal having a waveform such as shown in FIG. 28(F).

Other Embodiments

In a first modification of one of the first, second, third, fourth, and fifth embodiments, a predetermined location of an optical disc preliminarily stores information representing an address at which an irregular pit train or an unusual pit train is formed. When the optical disc is set in a reproduction device, the reproduction device first accesses the predetermined location of the optical disc and reads out information therefrom. According to the first modification, the address, at which the irregular pit train or the unusual pit train is formed, can be changed depending on the type of an optical disc. Thus, the analysis of copy protection in an optical disc is made more difficult, and illegally copying can be prevented effectively.

A second modification of one of the first and second embodiments is designed so that irregular pit trains of the first embodiment and unusual pit trains of the second embodiment coexist in a single optical disc. The second modification enhances the reliability of detection of an illegal copy disc.

According to a third modification of one of the first, second, third, fourth, and fifth embodiments, a process of checking whether an optical disc is legitimate or illegal is started in response to an instruction of the playback of the optical disc.

In a fourth modification of one of the first, second, third, fourth, and fifth embodiments, as shown in FIGS. 30(A) and 30(C), the positions of irregular pit trains or unusual pit trains (denoted by hatched regions in FIG. 30(C)) correspond to odd-numbered frames respectively while normal pit trains occupy even-numbered frames respectively. It should be noted that, as shown in FIGS. 30(A) and 30(B), the positions of irregular pit trains or unusual pit trains (denoted by hatched regions in FIG. 30(B)) correspond to even-numbered frames respectively in the first, second, third, fourth, and fifth embodiments.

In a fifth modification of one of the first, second, third, fourth, and fifth embodiments, as shown in FIGS. 30(A) and 30(D), every third frame corresponds to an irregular pit train or an unusual pit train (denoted by hatched regions in FIG. 30(D)) while other frames correspond to normal pit trains.

In a sixth modification of one of the first, second, third, fourth, and fifth embodiments, as shown in FIGS. 30(A) and 30(E), at least two successive frames are occupied by irregular pit trains or unusual pit trains (denoted by hatched regions in FIG. 30(E)). In general, such a set of irregular pit trains or unusual pit trains is periodically provided at intervals of a given number of frames.

In a seventh modification of one of the first, second, third, fourth, and fifth embodiments, as shown in FIGS. 30(A) and 30(F), at least two irregular pit trains or unusual pit trains (denoted by hatched regions in FIG. 30(F)) are formed in a flame which periodically occurs at given intervals.

In an eighth modification of one of the first, second, third, fourth, and fifth embodiments, as shown in FIGS. 30(A) and 30(G), an irregular pit train or an unusual pit train (denoted by a hatched region in FIG. 30(G)) occupies a later part of one frame.

In a ninth modification of one of the first, second, third, fourth, and fifth embodiments, as shown in FIGS. 30(H) and 30(I), every even-numbered frame is divided into four segments in time domain. Words of a given 4-bit code are assigned to even-numbered frames respectively. In addition, the four segments of every even-numbered frame are sequentially assigned to the 4 bits of a related code word respectively. In every even-numbered flame, a segment or segments corresponding to an "H" bit or "H" bits of a related code word are occupied by irregular pit trains (or unusual pit trains) while a segment or segments corresponding to an "L" bit or "L" bits of the related code word are occupied by normal pit trains.

According to a tenth modification of one of the first, second, third, fourth, and fifth embodiments, as shown in FIGS. 30(A) and 30(J), a delay of the start of an irregular pit train or an unusual pit train from the start of a frame increases stepwise and periodically returns as a1, a2, a3, a4, a5, and a1 in accordance with the updating of the frame.

According to an eleventh modification of one of the first, second, third, fourth, and fifth embodiments, irregular pit trains or unusual pit trains are provided in data-block units different from frame units.

What is claimed is:

1. An optical disc having a sequence of pits which extends along a track, the pit sequence representing a recorded signal divided into data blocks, the pit sequence including a normal pit train and an unusual pit train, the normal pit train being symmetrical with respect to a center of the track, the unusual pit train being different from the normal pit train in at least one of shape and pit arrangement, the unusual pit train being at a position having a predetermined relation with the data blocks and causing a variation in symmetry of an RF signal.

2. The optical disc of claim 1, wherein the unusual pit train is different from the normal pit train in duty factor.

3. An optical disc having a sequence of pits which extends along a track, the pit sequence representing a recorded signal divided into data blocks, the pit sequence including a normal pit train and an unusual pit train, the normal pit train being symmetrical with respect to a center of the track, the unusual pit train being different from the normal pit train in at least one of shape and pit arrangement, the unusual pit train being at a position having a predetermined relation with the data blocks, and representing a wobbling signal superimposed on a tracking error signal, wherein the wobbling signal represented by the unusual pit train has a burst shape.

4. The optical disc of claim 3, wherein pits in the unusual pit train are on the center of the track which radially wobbles at an amplitude smaller than a track pitch.

5. The optical disc of claim 4, wherein the wobble of the center of the track corresponds to a given frequency at which a reproduced signal component of a tracking error signal is minimized, and a carrier of the wobbling signal is maximized when information is reproduced from the optical disc by an optical pickup having tracking side beams, the given frequency being higher than a tracking servo frequency band.

6. The optical disc of claim 3, wherein the unusual pit train is located in a part of the optical disc in which a reproduced signal component of a tracking error signal is less than a reference when information is produced from the optical disc.

7. A device for checking an optical disc, comprising:
   first means for reproducing a signal from the optical disc;
   second means connected to the first means for detecting whether or not an unusual pit train is present in the optical disc by referring to the signal reproduced by the first means, the unusual pit train being different from a normal pit train in at least one of shape and pit arrangement, the normal pit train being symmetrical with respect to a track center; and
   third means connected to the second means for judging whether the optical disc is a legitimate production or an illegal production in response to a result of the detecting by the second means.

* * * * *